(12) United States Patent
Bacon

(10) Patent No.: US 10,730,367 B2
(45) Date of Patent: *Aug. 4, 2020

(54) VENT SHADE ASSEMBLY

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/906,007

(22) Filed: Feb. 27, 2018

(65) Prior Publication Data

US 2018/0370339 A1    Dec. 27, 2018

Related U.S. Application Data

(63) Continuation-in-part of application No. 15/634,306, filed on Jun. 27, 2017, now Pat. No. 10,596,883.

(51) Int. Cl.
*E06B 9/262* (2006.01)
*B60J 1/20* (2006.01)
(Continued)

(52) U.S. Cl.
CPC ........ *B60J 1/2088* (2013.01); *B60H 1/00364* (2013.01); *B60H 1/245* (2013.01);
(Continued)

(58) Field of Classification Search
CPC ......... E06B 2009/583; E06B 2009/527; E06B 2009/015; E06B 2009/2622;
(Continued)

(56) References Cited

U.S. PATENT DOCUMENTS 1,728,074 A     9/1929 Nicholas
1,888,522 A *  11/1932 Ward ..................... E06B 7/084
                                                           49/86.1

(Continued)

FOREIGN PATENT DOCUMENTS

CA        2881177 A      1/2014

OTHER PUBLICATIONS

Rick Kessler, "'Slim Shade' by AP Products is Gaining Traction," RV Business, http://www.rvbusiness.com, Nov. 21, 2016.

(Continued)

*Primary Examiner* — Johnnie A. Shablack
(74) *Attorney, Agent, or Firm* — Price Heneveld LLP

(57) ABSTRACT

A vent shade assembly for a recreational vehicle ceiling vent comprises a vent shade outer frame having an inner flange, a vent shade inner frame having an inner flange, and a pair of side walls disposed between the inner flange of each of the outer and inner frame to form a slot. A movable pleated shade element disposed within the slot is operable between a closed position and a plurality of positions there between. A first and a second shade string is disposed at least partially alongside and parallel to a first and second of the pair of side walls, respectively, and proximate a first and a second side edge of the movable pleated shade element, respectively. A portion of the inner flange of the vent shade outer frame supports the first and second side edge of the movable pleated shade element.

30 Claims, 20 Drawing Sheets

(51) Int. Cl.
    *B60J 7/16*  (2006.01)
    *B60H 1/24* (2006.01)
    *B60H 1/26* (2006.01)
    *B60H 1/00* (2006.01)
(52) U.S. Cl.
    CPC ............ *B60H 1/262* (2013.01); *B60J 1/2091* (2013.01); *B60J 7/1642* (2013.01)
(58) Field of Classification Search
    CPC ..... E06B 2009/2625; E06B 2009/2627; E06B 2009/3222; E06B 2009/1577; E06B 2009/1594; E06B 2009/1583; E06B 9/26; E06B 9/262; E06B 9/264; E06B 9/266; E06B 9/327
    See application file for complete search history.

(56) References Cited

U.S. PATENT DOCUMENTS

| | | | | |
|---|---|---|---|---|
| 2,637,382 A * | 5/1953 | Nelson | ................... | E06B 9/388 160/178.1 R |
| 2,780,283 A * | 2/1957 | Wasserman | ........... | E04D 13/033 160/26 |
| 2,875,710 A * | 3/1959 | Bechtold | ............. | E04D 13/0354 52/72 |
| 3,090,613 A * | 5/1963 | Bechtold | ............. | E04D 13/0352 49/325 |
| 3,161,230 A | 12/1964 | Knight | | |
| 3,265,117 A * | 8/1966 | Anderle | ................... | E06B 9/28 160/174 R |
| 3,818,969 A | 6/1974 | Debs | | |
| 3,924,671 A * | 12/1975 | Gates | ................... | E04D 13/033 160/183 |
| 4,202,395 A | 5/1980 | Heck et al. | | |
| 4,328,853 A | 5/1982 | Gall et al. | | |
| 4,369,828 A * | 1/1983 | Tatro | ................... | E06B 9/264 160/107 |
| 4,444,239 A * | 4/1984 | Haines | ................... | E06B 9/30 160/107 |
| 4,473,101 A * | 9/1984 | Langeler | ................... | E06B 9/32 160/279 |
| 4,505,070 A * | 3/1985 | Clipp | ................... | E06B 9/28 49/465 |
| 4,518,025 A | 5/1985 | Judkins | | |
| 4,521,993 A * | 6/1985 | Tacheny | ................... | E05F 11/06 49/325 |
| 4,552,196 A * | 11/1985 | Vecchiarelli | ............ | E06B 9/307 160/172 R |
| 4,557,309 A | 12/1985 | Judkins | | |
| 4,557,310 A | 12/1985 | Castellaw et al. | | |
| 4,570,393 A * | 2/1986 | Minter | ................... | E04D 13/031 49/483.1 |
| 4,577,619 A | 3/1986 | Howe, Jr. | | |
| 4,593,737 A | 6/1986 | Clemente | | |
| 4,594,821 A * | 6/1986 | Bechtold | ............. | E04D 13/0352 16/389 |
| 4,608,915 A | 9/1986 | Chatlos | | |
| 4,647,488 A | 3/1987 | Schnebly et al. | | |
| 4,665,964 A | 5/1987 | Zommers | | |
| 4,673,018 A | 6/1987 | Judkins | | |
| 4,687,038 A | 8/1987 | Clemente | | |
| 4,726,410 A | 2/1988 | Fresh | | |
| 4,727,921 A * | 3/1988 | Vecchiarelli | ............ | E06B 9/388 160/168.1 R |
| 4,733,710 A | 3/1988 | Haines | | |
| 4,739,816 A | 4/1988 | Dodich et al. | | |
| 4,753,281 A | 6/1988 | Wagner | | |
| 4,762,159 A | 8/1988 | Ford | | |
| 4,762,160 A * | 8/1988 | Bechtold | ............ | E04D 13/033 160/265 |
| 4,799,524 A | 1/1989 | Guermonprez | | |
| 4,825,929 A | 5/1989 | Haines | | |
| 4,852,627 A | 8/1989 | Peterson et al. | | |
| 4,917,167 A | 4/1990 | Voss et al. | | |
| 4,945,969 A | 8/1990 | Schnebly | | |
| 5,141,041 A | 8/1992 | Katz et al. | | |
| 5,195,569 A | 3/1993 | Peterson et al. | | |
| RE34,287 E * | 6/1993 | Berner | .................. | E05F 15/619 192/150 |
| 5,309,972 A | 5/1994 | Thomas | | |
| 5,351,737 A | 10/1994 | Hoshiyama | | |
| 5,377,737 A | 1/1995 | Moriya et al. | | |
| 5,535,806 A | 7/1996 | Kold et al. | | |
| 5,555,683 A * | 9/1996 | Schroeder | ........... | E04D 13/0358 52/200 |
| 5,699,845 A | 12/1997 | Jelic | | |
| 5,937,929 A | 8/1999 | Chen | | |
| 6,119,755 A * | 9/2000 | Oskam | ..................... | E06B 9/262 160/84.02 |
| 6,276,425 B1 | 8/2001 | Mausar et al. | | |
| 6,279,641 B1 | 8/2001 | Malott | | |
| 6,328,090 B1 | 12/2001 | Anderson et al. | | |
| 6,338,378 B1 | 1/2002 | Kold | | |
| 6,427,409 B2 | 8/2002 | Colson et al. | | |
| 6,481,486 B1 | 11/2002 | Sanz et al. | | |
| 6,560,941 B1 | 5/2003 | French | | |
| 6,601,633 B2 | 8/2003 | Sun et al. | | |
| 6,607,020 B1 | 8/2003 | Jensen | | |
| 6,758,255 B2 | 7/2004 | Sanz et al. | | |
| 6,918,216 B2 * | 7/2005 | Hoy | ........................ | E04D 13/03 359/591 |
| 6,932,139 B2 | 8/2005 | Early et al. | | |
| 7,216,687 B2 * | 5/2007 | Franssen | ................. | E06B 9/262 160/279 |
| 7,624,547 B1 | 12/2009 | Brinton et al. | | |
| 7,882,664 B2 * | 2/2011 | Lundsgaard | .......... | E04D 13/031 52/200 |
| 7,891,398 B2 | 2/2011 | Chino et al. | | |
| 8,312,684 B2 | 11/2012 | Gazaway et al. | | |
| 8,950,460 B2 | 2/2015 | Worthman et al. | | |
| 9,103,156 B1 | 8/2015 | Vassilev | | |
| 9,533,558 B2 | 1/2017 | Suh | | |
| 2003/0085001 A1* | 5/2003 | Sanz | ..................... | B64C 1/1484 160/84.04 |
| 2004/0159410 A1 | 8/2004 | Welfonder | | |
| 2004/0188037 A1* | 9/2004 | Schlater | ................... | E06B 9/581 160/133 |
| 2005/0028944 A1* | 2/2005 | Early | ...................... | E06B 9/264 160/107 |
| 2005/0101456 A1 | 5/2005 | Franssen | | |
| 2005/0173077 A1 | 8/2005 | Nicolosi | | |
| 2006/0231220 A1 | 10/2006 | Huang | | |
| 2007/0144684 A1 | 6/2007 | Hutchings et al. | | |
| 2007/0267152 A1 | 11/2007 | Fan | | |
| 2008/0148638 A1 | 6/2008 | Knowles | | |
| 2009/0071087 A1* | 3/2009 | Achen | ...................... | E06B 7/02 52/302.1 |
| 2009/0205787 A1 | 8/2009 | Allsopp | | |
| 2009/0242141 A1 | 10/2009 | Trotta et al. | | |
| 2011/0005690 A1 | 1/2011 | Harding | | |
| 2011/0108208 A1 | 5/2011 | Knowles et al. | | |
| 2011/0192091 A1 | 8/2011 | Smith et al. | | |
| 2012/0061031 A1 | 3/2012 | Zhang | | |
| 2014/0048219 A1 | 2/2014 | Knowles | | |
| 2014/0138036 A1 | 5/2014 | de Vries et al. | | |
| 2015/0218881 A1 | 8/2015 | Cheringal et al. | | |
| 2015/0225996 A1 | 8/2015 | Maksan | | |
| 2015/0275571 A1 | 10/2015 | Guhl | | |
| 2015/0352924 A1 | 12/2015 | Allard et al. | | |
| 2015/0368962 A1* | 12/2015 | Motosko | ................. | E06B 9/581 160/107 |
| 2016/0229514 A1 | 8/2016 | Mohat et al. | | |
| 2016/0348426 A1 | 12/2016 | Glavas | | |
| 2017/0008379 A1 | 1/2017 | Gennissen | | |
| 2017/0216756 A1 | 8/2017 | Fox et al. | | |
| 2017/0267071 A1 | 9/2017 | McKinnon | | |
| 2017/0350133 A1 | 12/2017 | Chung | | |
| 2018/0258691 A1* | 9/2018 | Baggett | ................... | E06B 9/327 |
| 2018/0370338 A1 | 12/2018 | Bacon | | |
| 2018/0370339 A1* | 12/2018 | Bacon | ................... | B60J 1/2088 |

(56) References Cited

U.S. PATENT DOCUMENTS

OTHER PUBLICATIONS

AP Products Catalog, Coldwater, Michigan (2017).
Camco RV Vent Insulator, https://www.walmart.com/ip/Camco-RV-Vent-Insulator/16927797 (published at least on or before Mar. 25, 2017).
Camco 42913 Retractable Lights Out Vent Shade, https://www.amazon.com/Camco-42913-Retractable-Lights-Shade/dp/B000EDUTW2 (published at least on or before Mar. 25, 2017).

* cited by examiner

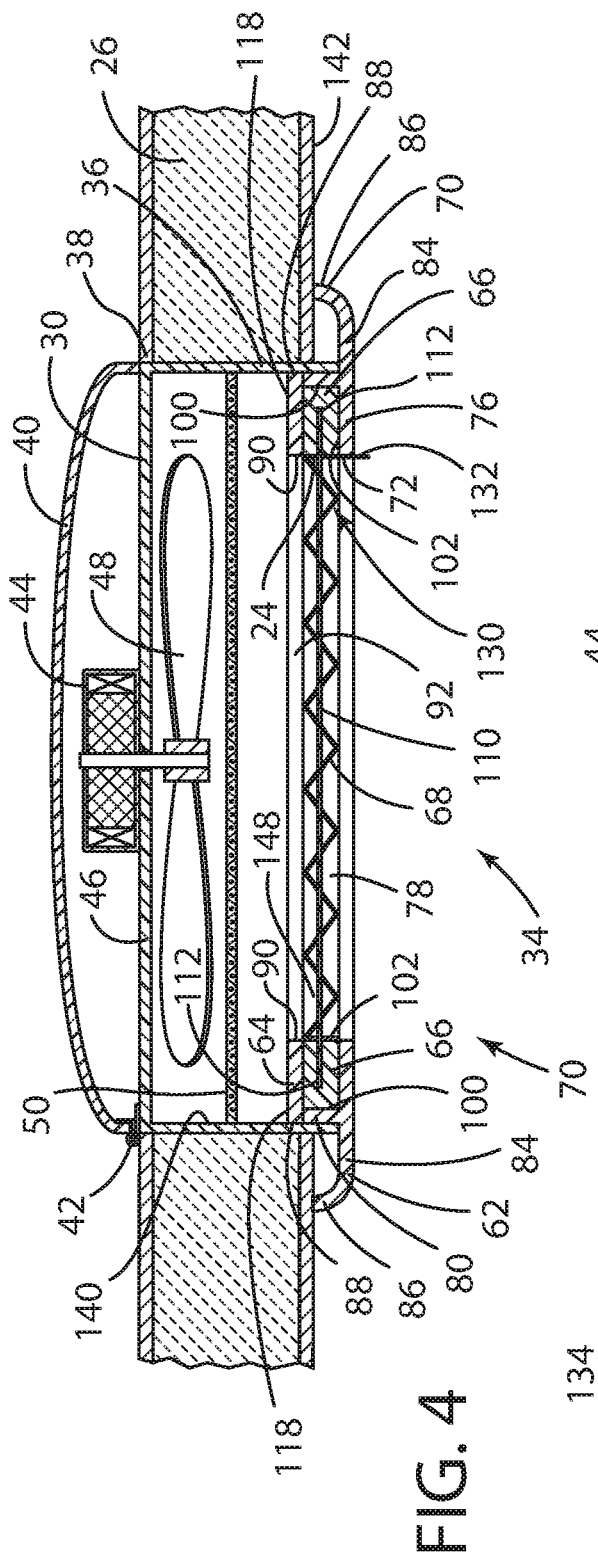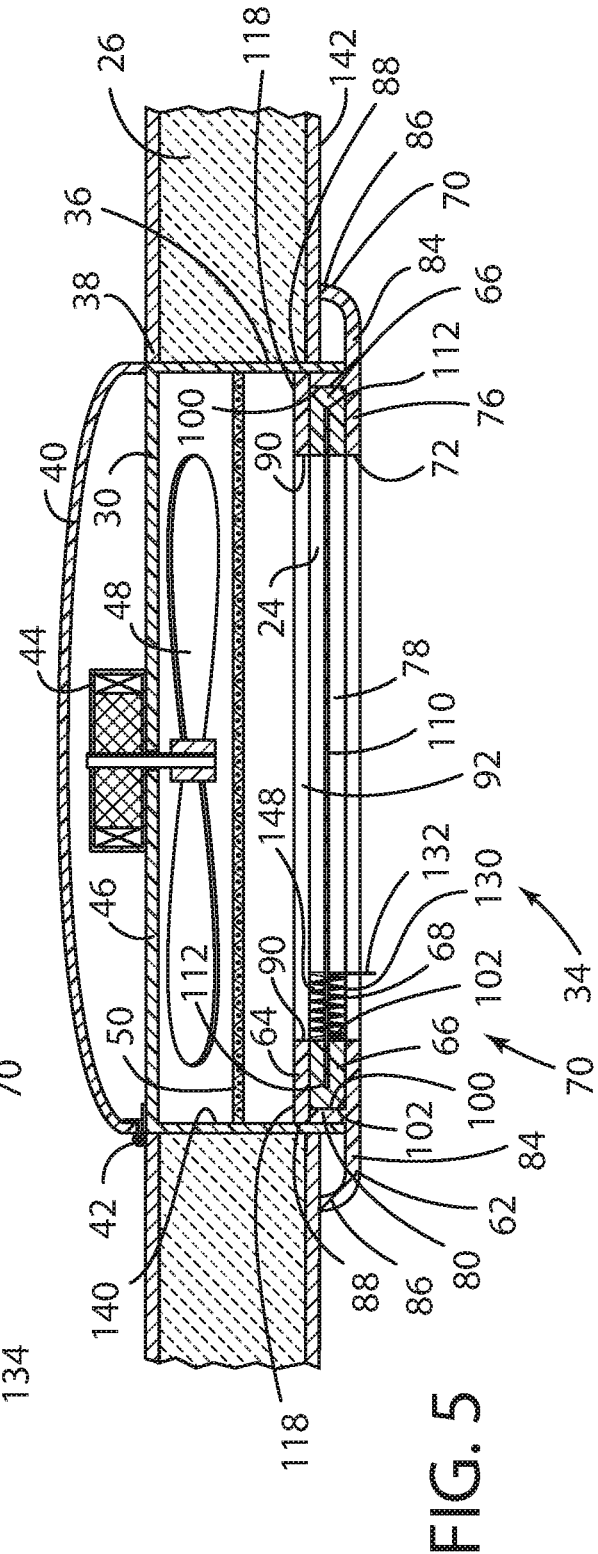

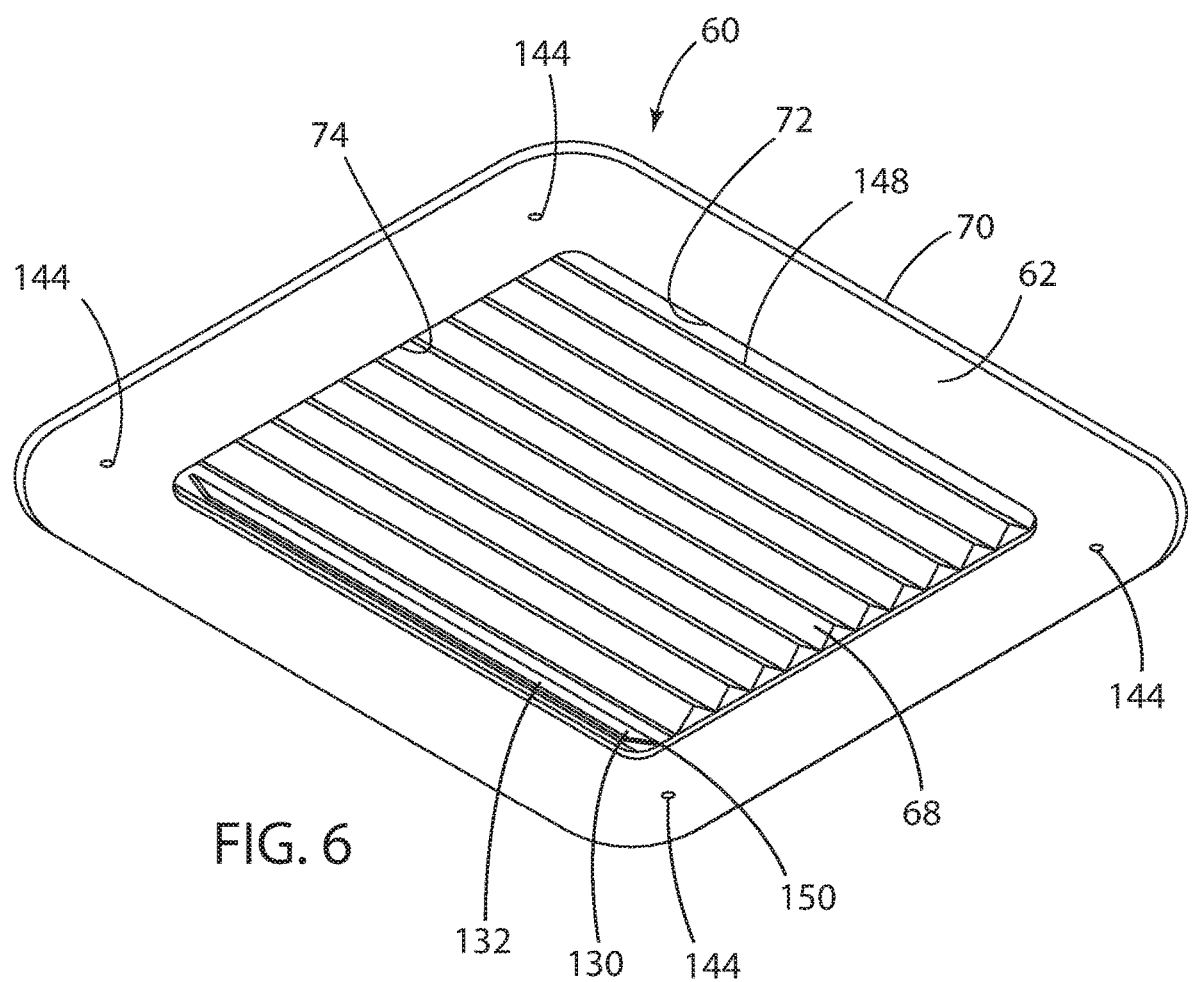

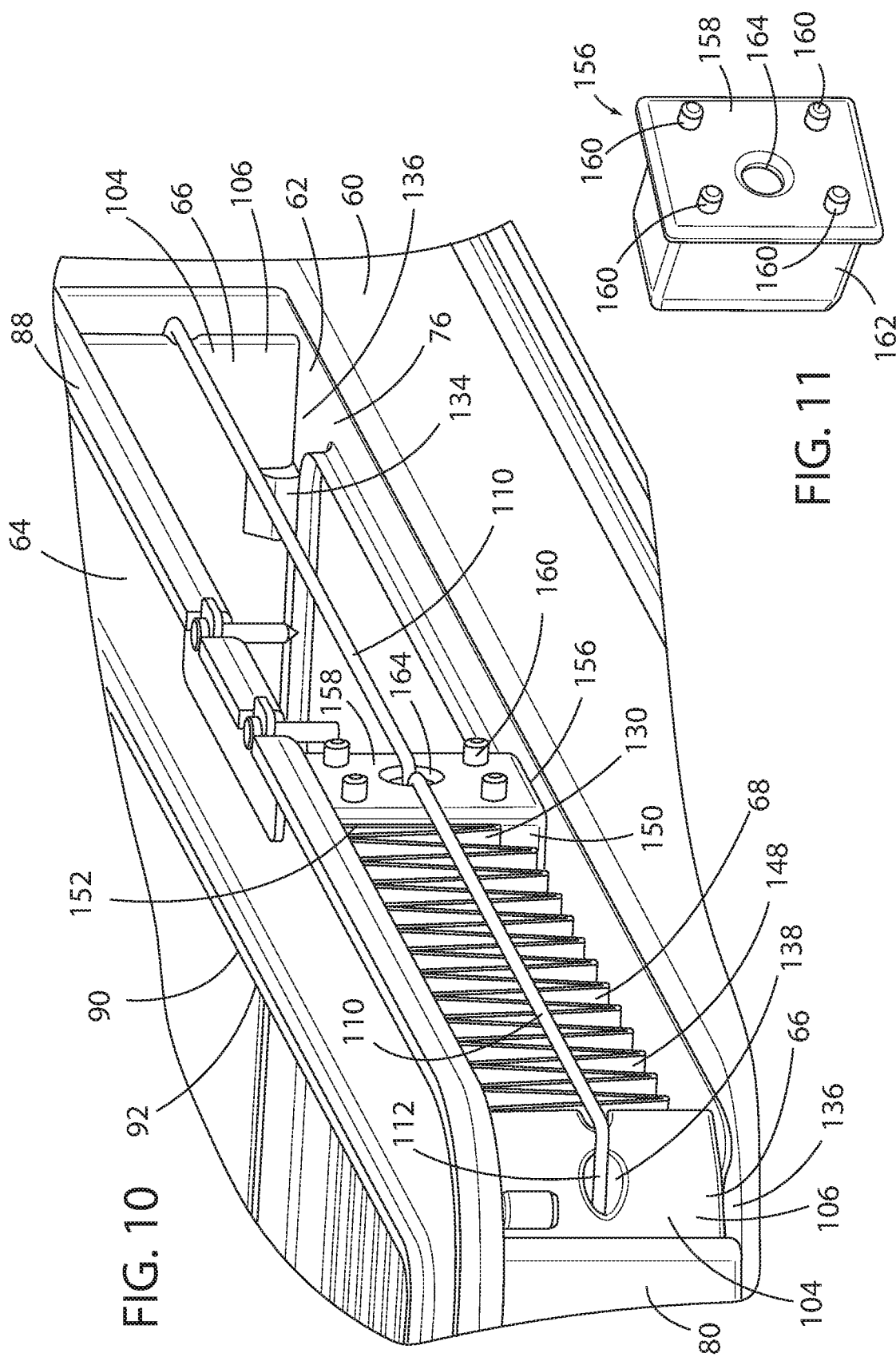

US 10,730,367 B2

VENT SHADE ASSEMBLY

CLAIM OF PRIORITY

This application is a continuation-in-part of and claims priority under 35 U.S.C. § 120 to commonly assigned and related U.S. Pat. No. 10,596,883, issued Mar. 24, 2020, entitled VENT SHADE ASSEMBLY, the entire disclosure of which is incorporated herein by reference.

FIELD OF THE INVENTION

The present invention generally relates to an assembly providing a moveable shade for ceiling vents for use in recreational vehicles and, more particularly, a pleated movable shade assembly for a recreational vehicle ceiling vent that is supported along a pair of opposed side edges by an inner flange of a vent shade outer frame proximate a pair of side walls.

BACKGROUND OF THE INVENTION

Modern recreational vehicles, such as motor coaches and travel trailers, often employ one or more ceiling vents mounted in one or more openings provided in the roof portion of the body of the recreational vehicle. Such ceiling vents are primarily designed to allow light in to assist in illuminating the interior of the body of the recreational vehicle. Many designs of such ceiling vents may also be opened to allow fresh air into and odors out of the interior of the body of the recreational vehicle. However, in the event that the recreational vehicle occupant wishes a darker environment, such as for sleeping, such ceiling vents present the problem of unwanted illumination. Further, in the event of relatively cold or relatively hot exterior ambient temperatures, such ceiling vents do not provide effective insulation. An improved vent shade assembly for a recreational vehicle ceiling vent, particularly a vent shade assembly that may be retrofitted to existing ceiling vents, that provides effective light control and increased insulative properties is desired.

SUMMARY OF THE INVENTION

According to one aspect of the present disclosure, a vent shade assembly for a recreational vehicle ceiling vent comprises a vent shade outer frame having an inner flange, a vent shade inner frame having an inner flange, and a pair of side walls disposed between the inner flange of each of the outer and inner frame to form a slot. A movable pleated shade element disposed within the slot is operable between a closed position, and a plurality of positions there between. A first and a second shade string is disposed at least partially alongside and parallel to a first and second of the pair of side walls, respectively, and proximate a first and a second side edge of the movable pleated shade element, respectively. A portion of the inner flange of the vent shade outer frame supports the first and second side edge of the movable pleated shade element.

According to another aspect of the present disclosure, a vent shade assembly for a recreational vehicle ceiling vent comprises a vent shade assembly for a recreational vehicle ceiling vent that includes a vent shade outer frame having an outer flange forming an outer perimeter and an inner flange forming an inner perimeter and defining a first opening coincident with the recreational vehicle ceiling vent and a vent shade inner frame having an outer perimeter and an inner flange forming an inner perimeter and defining a second opening coincident with the recreational vehicle ceiling vent. A pair of side walls is disposed adjacent opposed sides of the vent shade outer frame between the outer flange and the inner flange, while a movable pleated shade element disposed between the pair of side walls, wherein the movable pleated shade element is operable between a closed position substantially occluding the first opening and second opening, an open position substantially exposing the first and second opening, and a plurality of positions there between. A first and a second shade string are disposed at least partially alongside and parallel to a first and second of the pair of side walls, respectively, and proximate a first and a second side edge of the movable pleated shade element forming a pair of opposed side edges, respectively. A portion of the inner flange of the vent shade outer frame proximate the pair of side walls supports a pair of opposed side edges of the movable pleated shade element as the movable pleated shade element is operated between the closed position and the open position.

According to a further aspect of the present disclosure, a vent shade assembly for a recreational vehicle ceiling vent comprises a vent shade assembly for a recreational vehicle ceiling vent having a vent shade outer frame having an outer flange forming an outer perimeter and an inner flange forming an inner perimeter and defining a first opening coincident with the recreational vehicle ceiling vent. A pair of side walls are arranged on the vent shade outer frame between the outer flange and the inner flange, one each of the pair of side walls disposed on opposed sides of the vent shade outer frame. A movable pleated shade element is disposed between the pair of side walls, wherein the movable pleated shade element is operable between a closed position substantially occluding the first opening, an open position substantially exposing the first opening, and a plurality of positions there between. A first and a second shade string are disposed at least partially alongside and parallel to a first and second of the pair of side walls, respectively, and proximate the movable pleated shade element, respectively. The inner flange of the vent shade outer frame proximate the pair of side walls supports the movable pleated shade element as the movable pleated shade element is operated between the closed position and the open position.

According to still another aspect of the present disclosure, a vent shade assembly for a recreational vehicle ceiling vent comprises a substantially rectangular vent shade outer frame having an outer flange forming an outer perimeter and an inner flange forming an inner perimeter and defining a first opening coincident with the recreational vehicle ceiling vent, and a substantially rectangular vent shade inner frame having an outer perimeter and an inner flange forming an inner perimeter and defining a second opening coincident with the recreational vehicle ceiling vent. A pair of side walls are disposed adjacent the vent shade outer frame between the outer flange and the inner flange, one each of the pair of side walls being disposed adjacent opposed sides of the vent shade outer frame, wherein the inner flange of vent shade inner frame cooperates with a portion of the inner flange of the vent shade outer frame proximate the pair of side walls to define a slot. A pair of opposed string guides is restrained between the inner flange of the vent shade outer frame and the inner flange of the vent shade inner frame and orthogonally mounted relative the pair of side walls. A pair of shade strings extends between the pair of opposed string guides. A movable pleated shade element is received and retained within the slot as it is operated between a closed position substantially occluding the first opening of the vent shade outer frame and an open position. A pair of opposed side edges of the movable pleated shade element is supported by the portion of the inner flange of the vent shade outer frame proximate the pair of side walls.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a side cross-sectional view of the assembled vent shade assembly of FIG. 2 in accordance with the present disclosure installed in one of the ceiling vents of the recreational vehicle of FIG. 1, wherein the movable pleated shade element is in the closed position; and FIG. 5 is a side cross-sectional view of the assembled vent shade assembly of FIG. 2 in accordance with the present disclosure installed in one of the ceiling vents of the recreational vehicle of FIG. 1, wherein the movable pleated shade element is in the open position.

FIG. 6 is a bottom plan view of a second embodiment of an assembled vent shade assembly, wherein the movable pleated shade element is in the closed position;

FIG. 10 is a perspective side view of the partially assembled vent shade assembly of FIG. 6 in accordance with the present disclosure, wherein the movable pleated shade element is in the partially open position;

FIG. 11 is a perspective side view of the cross member end cap of the cross member of the partially assembled vent shade assembly of FIG. 10 in accordance with the present disclosure;

DETAILED DESCRIPTION OF THE PREFERRED EMBODIMENTS

Figure 2:
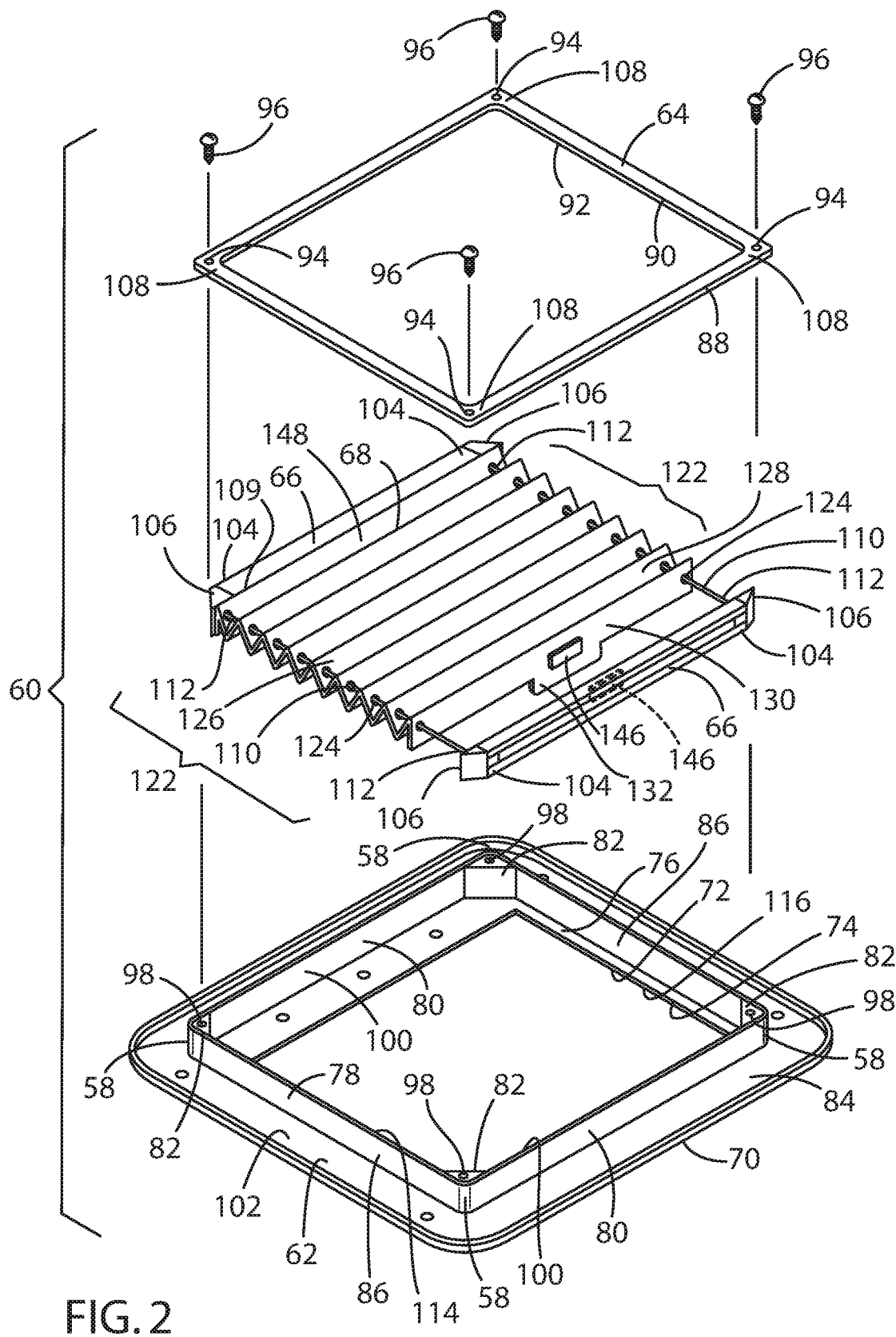
FIG. 2 is an exploded top side perspective view of a first embodiment of a vent shade assembly in accordance with the present disclosure adapted for installation to one or more of the ceiling vents of the recreational vehicle of FIG. 1.

For purposes of description herein, the terms "upper," "lower," "right," "left," "rear," "front," "vertical," "horizontal," "interior," "exterior," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
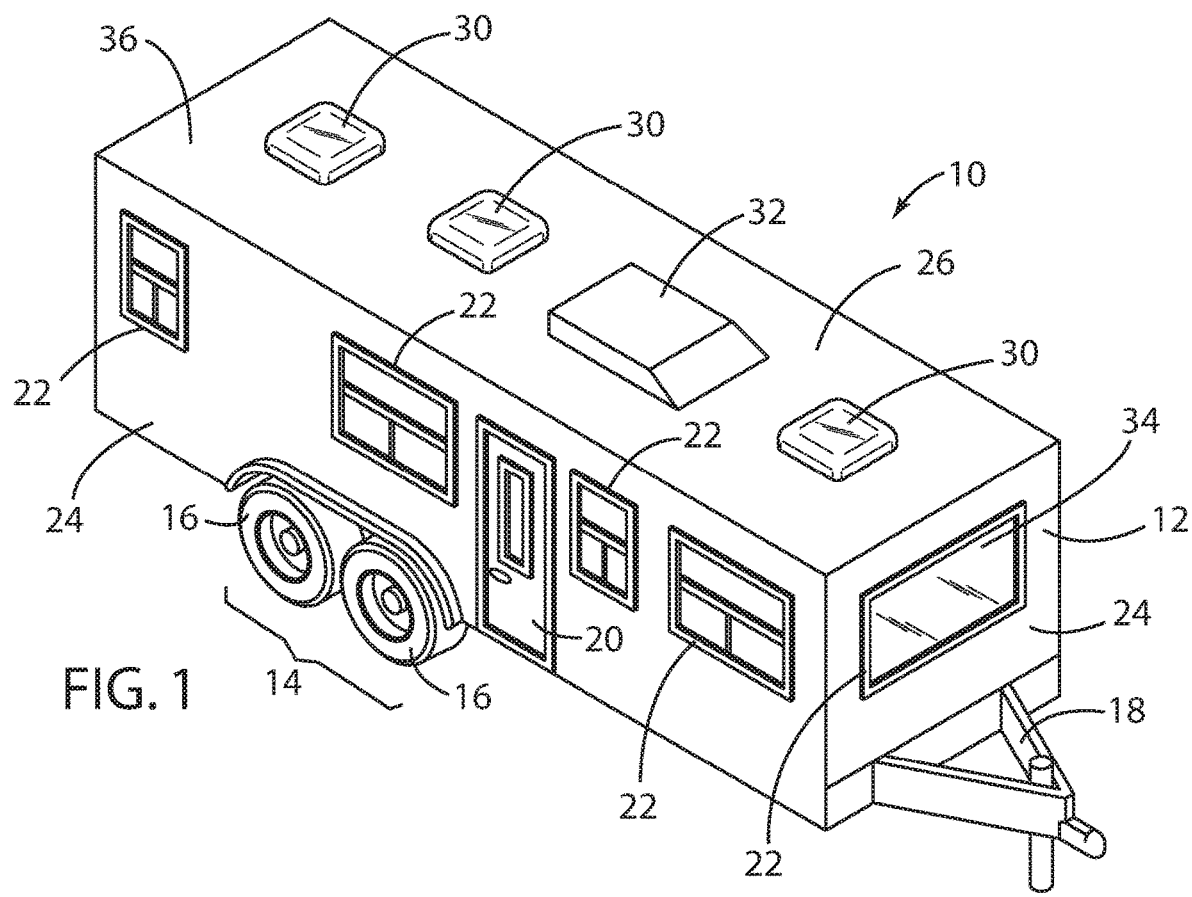
FIG. 1 is a front side perspective view of a recreational vehicle provided with a plurality of ceiling vents on a roof portion thereof.

Referring to FIG. 1, reference numeral 10 generally designates a recreational vehicle travel trailer particularly adapted for being towed by a motor vehicle (not shown). However, other recreational vehicle 10 configurations may advantageously employ the benefits of the present disclosure, such as and including motor coaches and so-called fifth wheel travel trailers. In the embodiment contemplated herein, the recreational vehicle 10 generally comprises a body 12 that is primarily supported by a pair of axles 14, each comprising at least one pair of opposed road wheels and an axle assembly 16, and a trailer tongue 18 by which the recreational vehicle 10 be attached to the tow vehicle. As is typical, the recreational vehicle 10 has a door 20 for ingress and egress and a plurality of windows 22 arranged on side walls 24 of the body 12. A roof portion 26 is provided to enclose the body 12 and typically includes one or more ceiling vents 30, typically arranged along the longitudinal length of the recreational vehicle 10. Optionally, an air conditioning unit 32 can be mounted on the roof portion 26 as well.

The ceiling vents 30 to which the present disclosure may be applied are primarily installed to provide light and ventilation to the interior 34 of the body 12 of the recreational vehicle 10. That is, each ceiling vent 30 is typically operable between a closed position, in which the elements are maintained outside of the interior 34 of the body 12 of the recreational vehicle 10, and an open position, by which fresh air may be introduced into the interior 34 of the body 12 of the recreational vehicle 10. As shown in FIGS. 4 and 5, the ceiling vent 30 generally comprises a body portion 36, preferably in sealed relation within an opening 38 in the roof portion 26 of the recreational vehicle 10, and an upper dome 40. The upper dome 40 of the ceiling vent 30 may be movable about a hinge 42 between the closed position and the open position and is typically constructed of a clear transparent material, such as glass or, more commonly, clear or tinted polycarbonate. When in the open position, in a typical preferred embodiment, a fan motor 44 supported by an open frame 46 may preferably be actuated to operate a fan 48 to exhaust air from the interior 34 of the body 12 of the recreational vehicle 10 and thereby cool the interior 34 of the body 12 of the recreational vehicle 10, as is known. A screen 50 may also be disposed below the fan 48 to prevent interaction of any object within the interior 34 of the body 12 of the recreational vehicle 10 with the fan 48, and to allow air to pass through the ceiling vent 30. However, the advantages of the present disclosure do not require the presence of a fan 48 or a fan motor 44.

As shown in FIG. 2, the vent shade assembly 60 according to the present disclosure generally includes a vent shade outer frame 62, a vent shade inner frame 64, a pair of opposed string guides 66 restrained between the vent shade inner frame 64 and the vent shade outer frame 62, and a movable pleated shade element 68 operable between a closed position and an open position.

Figure 3:
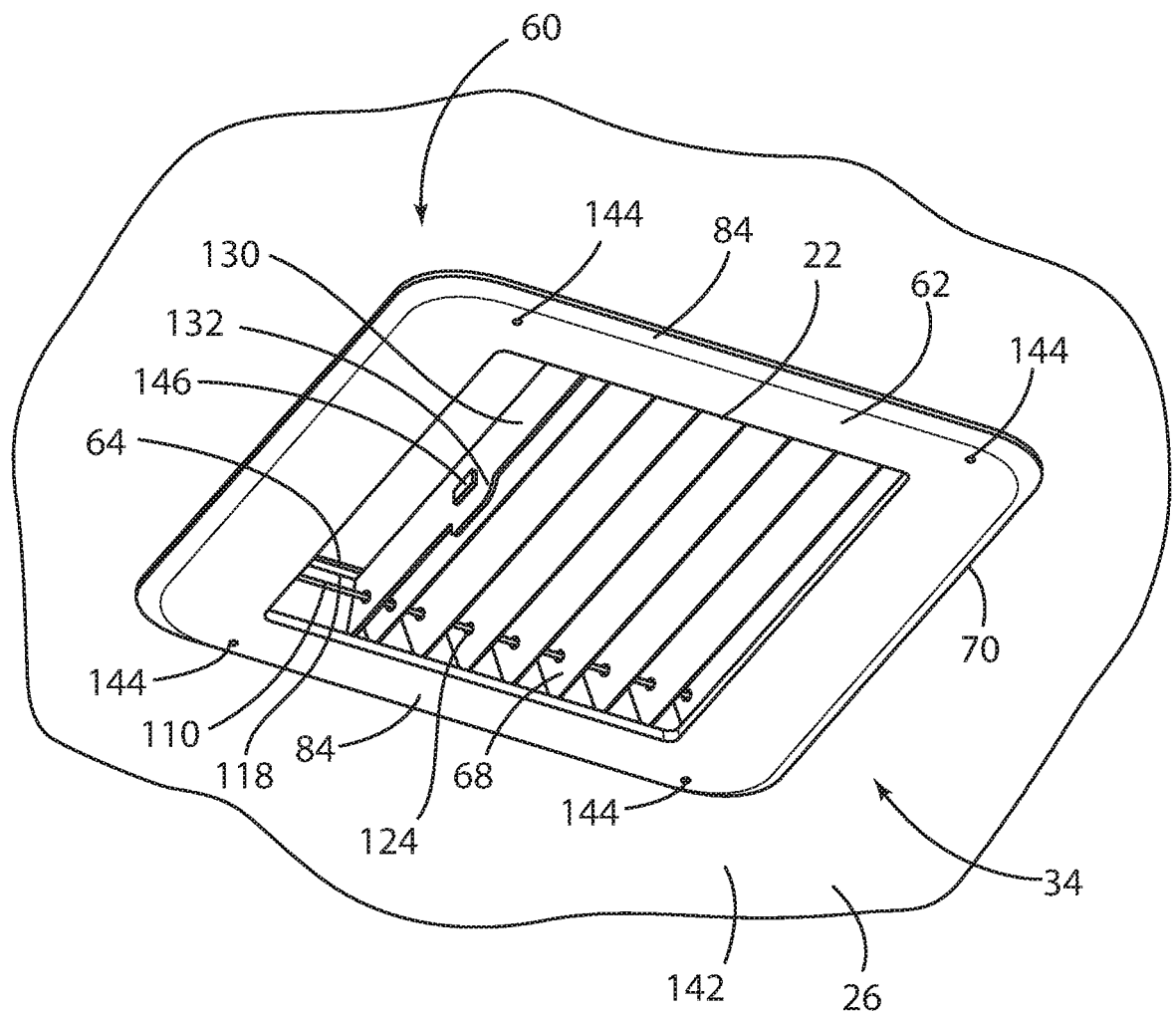
FIG. 3 is a bottom side perspective view of the assembled vent shade assembly of FIG. 2 in accordance with the present disclosure installed in one of the ceiling vents of the recreational vehicle of FIG. 1.
Figure 7:
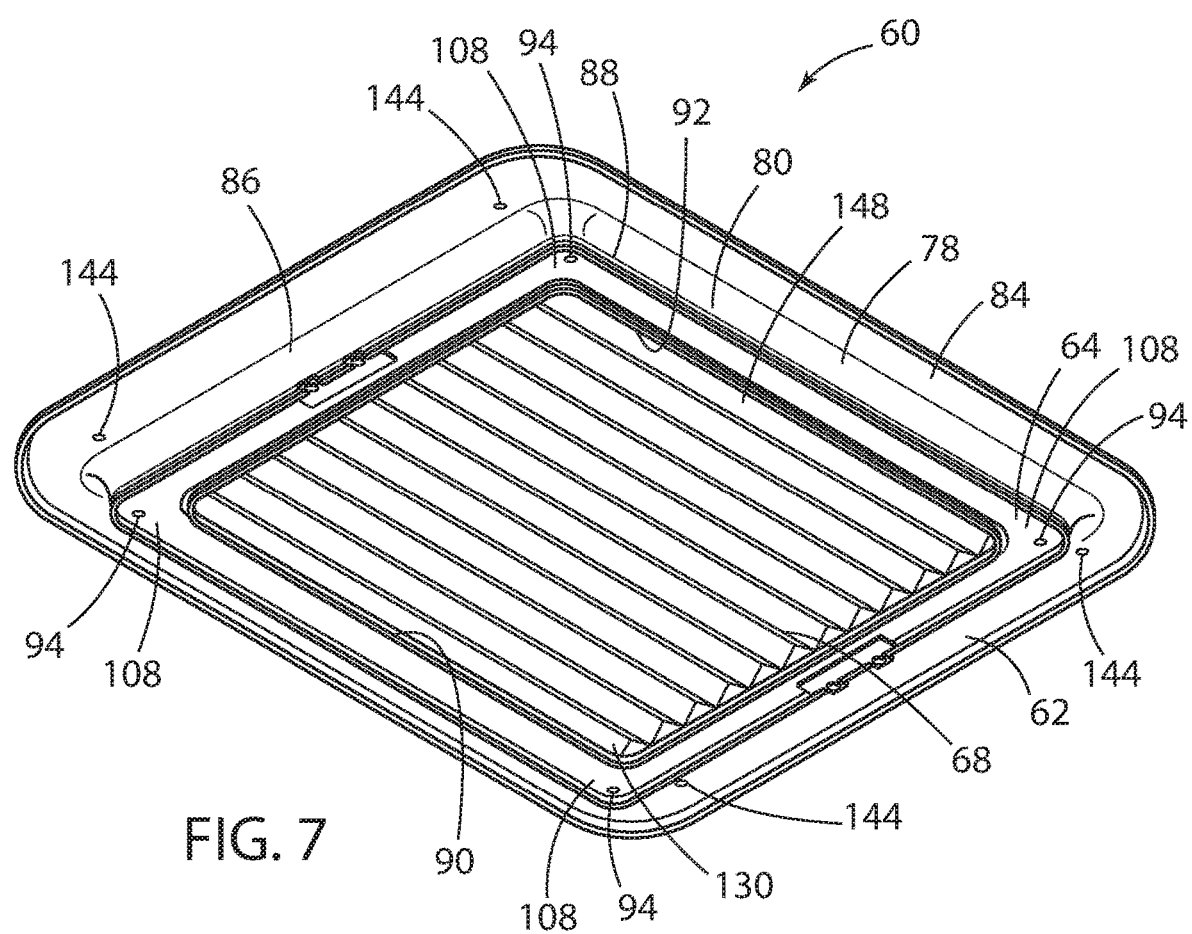
FIG. 7 is a top plan view of the assembled vent shade assembly of FIG. 6 in accordance with the present disclosure, wherein the movable pleated shade element is in the closed position.
Figure 8:
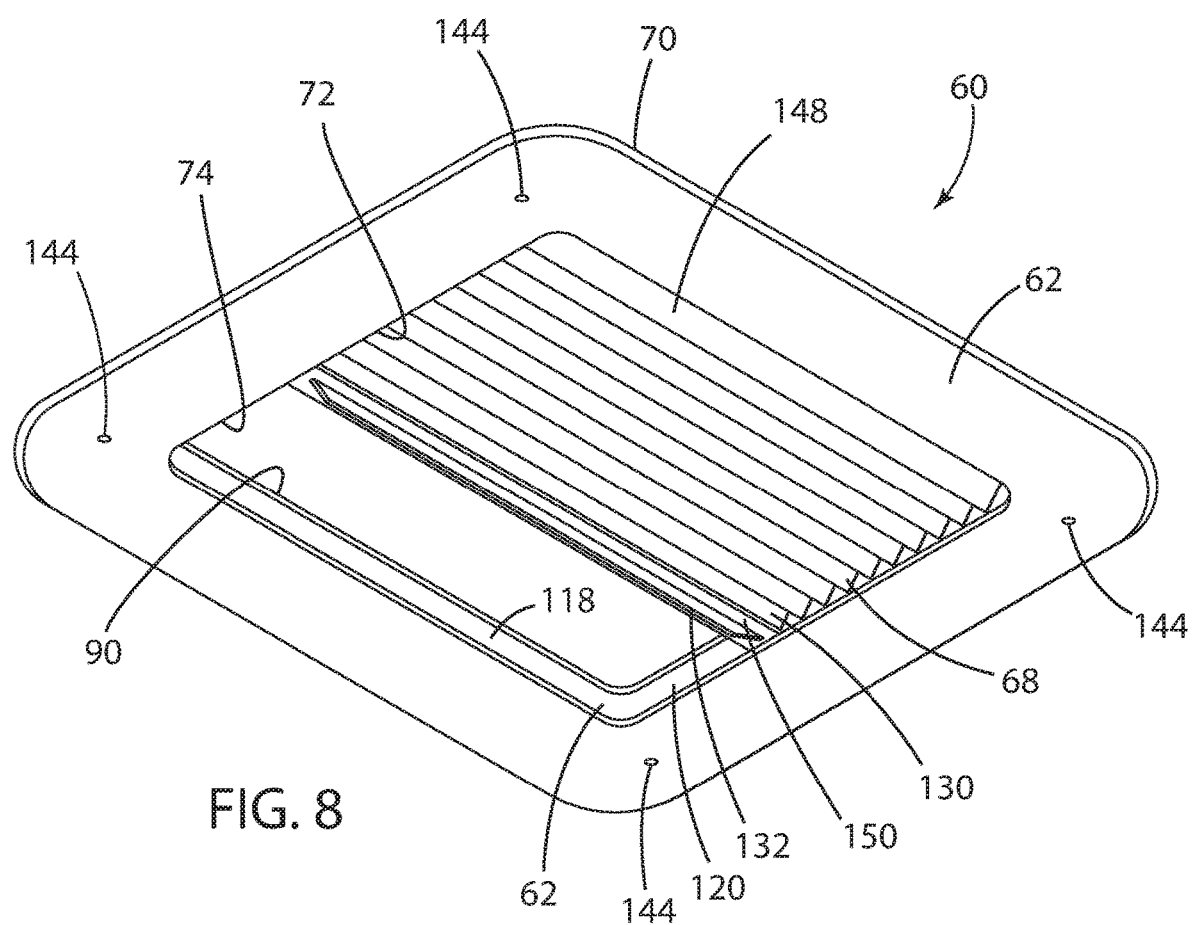
FIG. 8 is a bottom plan view of the assembled vent shade assembly of FIG. 6 in accordance with the present disclosure, wherein the movable pleated shade element is in the partially open position.
Figure 9:
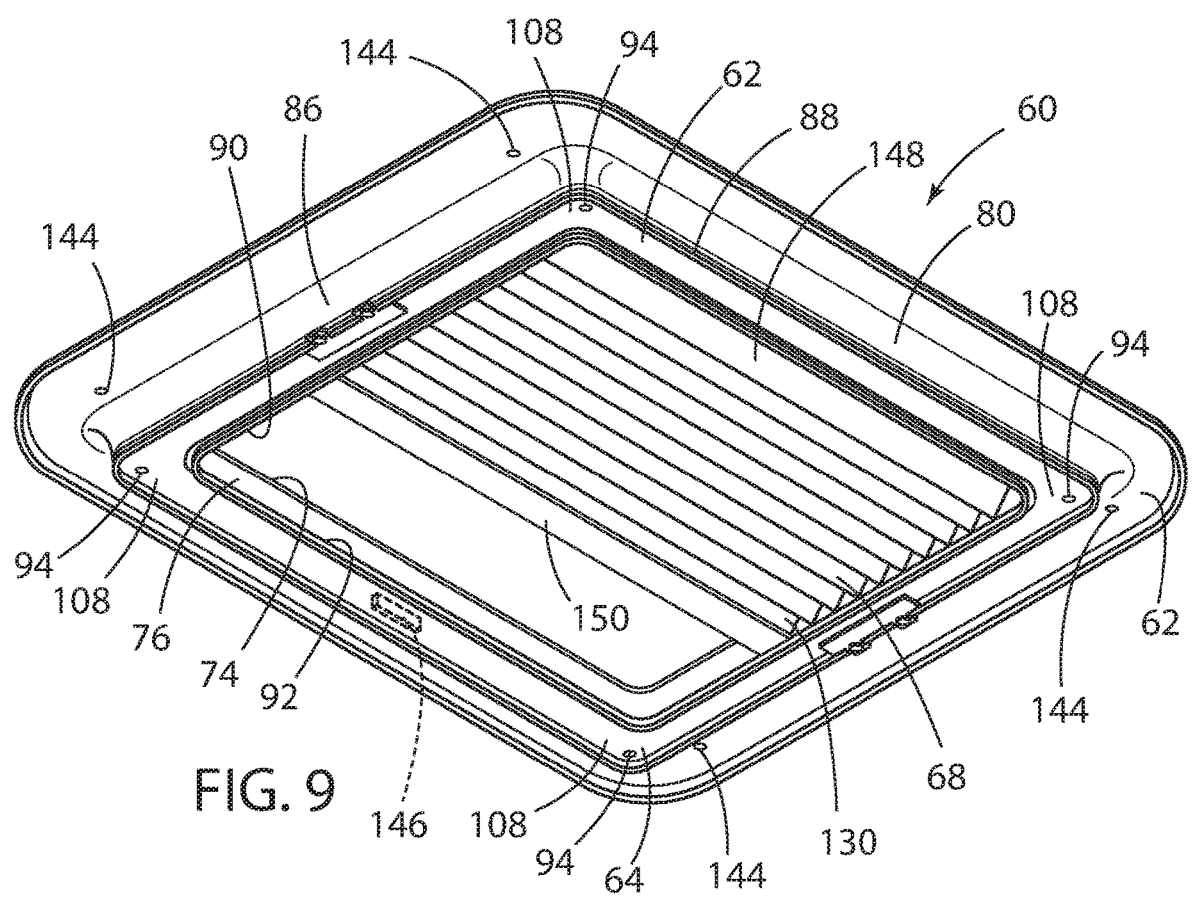
FIG. 9 is a top plan view of the assembled vent shade assembly of FIG. 6 in accordance with the present disclosure, wherein the movable pleated shade element is in the partially open position.
Figure 12:
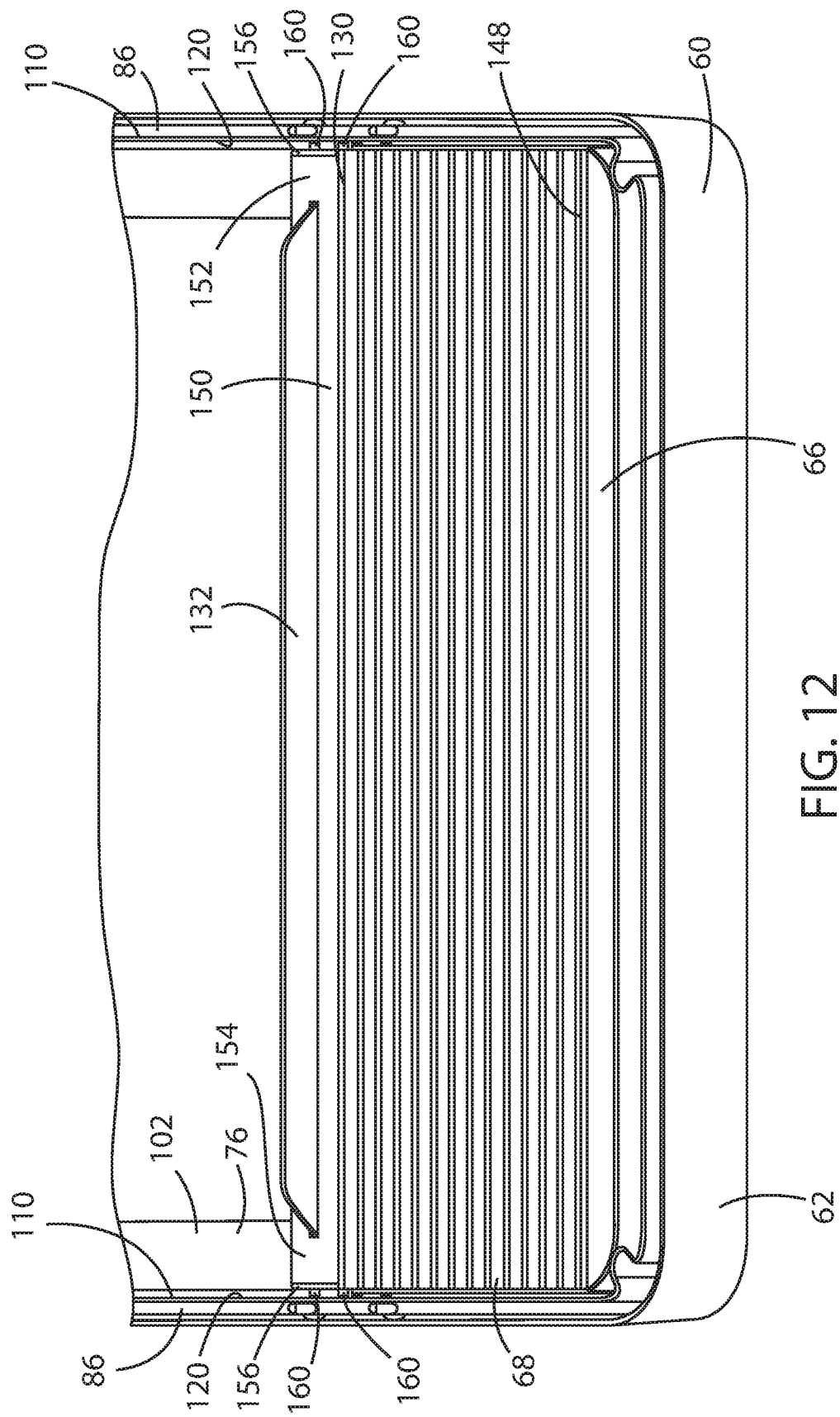
FIG. 12 is a perspective top view of the partially assembled vent shade assembly of FIG. 6 in accordance with the present disclosure, wherein the movable pleated shade element is in the partially open position.

As best shown in FIGS. 2 and 3, the vent shade outer frame 62 has a substantially rectangular configuration having an outer perimeter 70 and an inner perimeter 72. The inner perimeter 72 of the vent shade outer frame 62 defines a first opening 74 coincident with the recreational vehicle ceiling vent 30, as shown in FIGS. 4 and 5. An inner flange 76 defines the inner perimeter 72 of the vent shade outer frame 62, and a center wall 78 is disposed substantially about the inner perimeter 72 of the vent shade outer frame 62 at a predetermined distance from the edge of the inner flange 76 defining the inner perimeter 72.

Preferably, the inner flange 76 and the center wall 78 may also have a rectangular configuration that substantially corresponds with the overall rectangular configuration of the vent shade outer frame 62. The center wall 78 is preferably disposed perpendicularly to the plane of the vent shade outer frame 62 and also preferably includes a pair of side walls 86 integrally formed with the center wall 78 and disposed adjacent opposed sides of the vent shade outer frame 62 between an outer flange 84 and the inner flange 76, as further discussed below. For example, in the case where the vent shade outer frame 62 is injection molded, the pair of side walls 86 may be advantageously injection molded and thus integrally formed with the vent shade outer frame 62 as a single unitary component.

The movable pleated shade element 68 is preferably disposed adjacent and between the pair of side walls 86. The center wall 78 also preferably includes a pair of opposed braces 80 disposed proximate the inner perimeter 72 of the vent shade outer frame 62, as further discussed below. Preferably, the pair of opposed braces are also integral with a center wall substantially circumscribing the first opening and likewise may be advantageously injection molded with the vent shade outer frame as a single unitary component. As shown in FIG. 2, a boss 82 (preferably triangular) may be integrated into each corner 58 of the center wall 78 between each of the orthogonally situated opposed braces 80 and side walls 86, whereby the vent shade inner frame 64 may be mounted via the bosses 82, as further described below.

The outer flange 84 of the vent shade outer frame 62 defines the outer perimeter 70 thereof. Preferably, the outer flange 84 has a configuration substantially corresponding to the center wall 78 about the outer perimeter 70 of the vent shade outer frame 62. Preferably, the outer flange 84 may also have a rectangular configuration that substantially corresponds with the rectangular configuration of the vent shade outer frame 62. The vent shade outer frame 62 is preferably economically manufactured from polystyrene polymer materials and can be tinted to match the color of the interior 34 of the body 12 of the recreational vehicle 10, as may be desired.

The vent shade inner frame 64 likewise has a substantially rectangular configuration having an outer perimeter 88 and an inner perimeter 90 between which defines an inner flange 118 of the vent shade inner frame 64, as best seen in FIGS. 3, 4, 5, 8, 15, 16, 17, and 22. The inner perimeter 90 of the vent shade inner frame 64 defines a second opening 92 coincident with the recreational vehicle ceiling vent 30, as shown in FIGS. 4 through 9. Preferably, the vent shade inner frame 64 may also have a rectangular configuration that substantially corresponds with the rectangular configuration of the vent shade outer frame 62. In particular, as shown in FIG. 2, the outer perimeter 88 of the vent shade inner frame 64 preferably is configured to substantially correspond with the center wall 78 of the vent shade outer frame 62. Alternatively, the center wall 78, as well as the pair of side walls 86, may be integrally formed and injection molded with the vent shade inner frame.

An opening 94 may be disposed on each corner 108 of the vent shade inner frame 64 through which a fastener 96 may be inserted and attached to a corresponding opening 98 in each of the triangular bosses 82 disposed at each interior corner of the center wall 78 in order to effectuate a mechanical attachment of the vent shade inner frame 64 to the vent shade outer frame 62, as perhaps best shown in FIG. 2. Alternatively, each corner 108 of the vent shade inner frame 64 may be heat staked to the vent shade outer frame 62 at a plurality of locations about the inner perimeter 90, 72 of each of the vent shade inner frame 64 and the vent shade outer frame 62, respectively, such as at each of the triangular bosses 82 disposed at each interior corner 58 of the center wall 78. The vent shade inner frame 64 is also preferably economically manufactured from polystyrene polymer materials and can be tinted to match the color of the interior of the body 12 of the recreational vehicle 10, as may be desired.

Thus, in the embodiments shown, the outer perimeter 88 of the vent shade inner frame 64 may be mounted to the pair of side walls 86 and a portion of the inner flange 118 of the vent shade inner frame 64 cooperates with a portion of the inner flange 76 of the vent shade outer frame 62 proximate the pair of side walls 86 to define a slot 120 within which the movable pleated shade element 68 is received and retained as it is operated between the closed position and the open position, as further described below. As shown, the movable pleated shade element 68 is in sliding engagement with the side walls 86 as it is operated between the closed position and the open position.

The movable pleated shade element 68 also preferably has a deployed rectangular shape substantially conforming to the outer perimeter 88 of the vent shade inner frame 64, wherein the movable pleated shade element 68 is operable between a closed position and an open position. When in the closed position, the movable pleated shade element 68 preferably substantially occludes the first opening 74 of the vent shade outer frame 62, thereby preventing light from passing through the vent shade assembly 60. More particularly, the movable pleated shade element 68 in the closed position is preferably larger than the first and second openings 74, 92.

Figure 15:
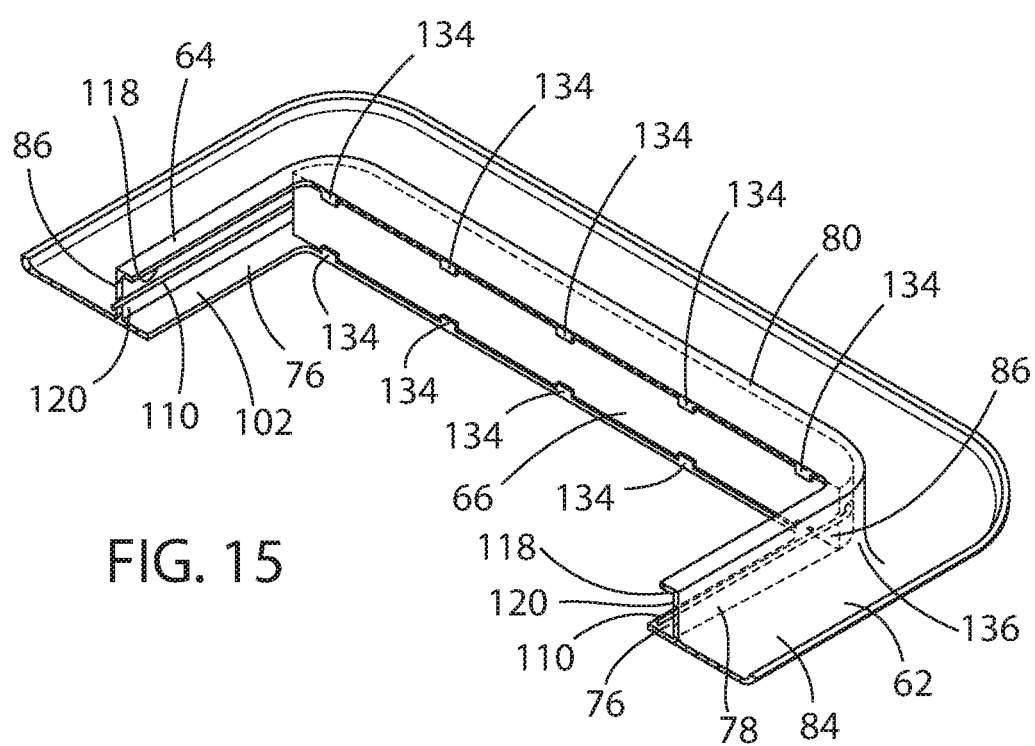
FIG. 15 is a perspective view of a string guide and vent shade outer and inner frame of the vent shade assembly of FIG. 6 in accordance with the present disclosure.
Figure 16:
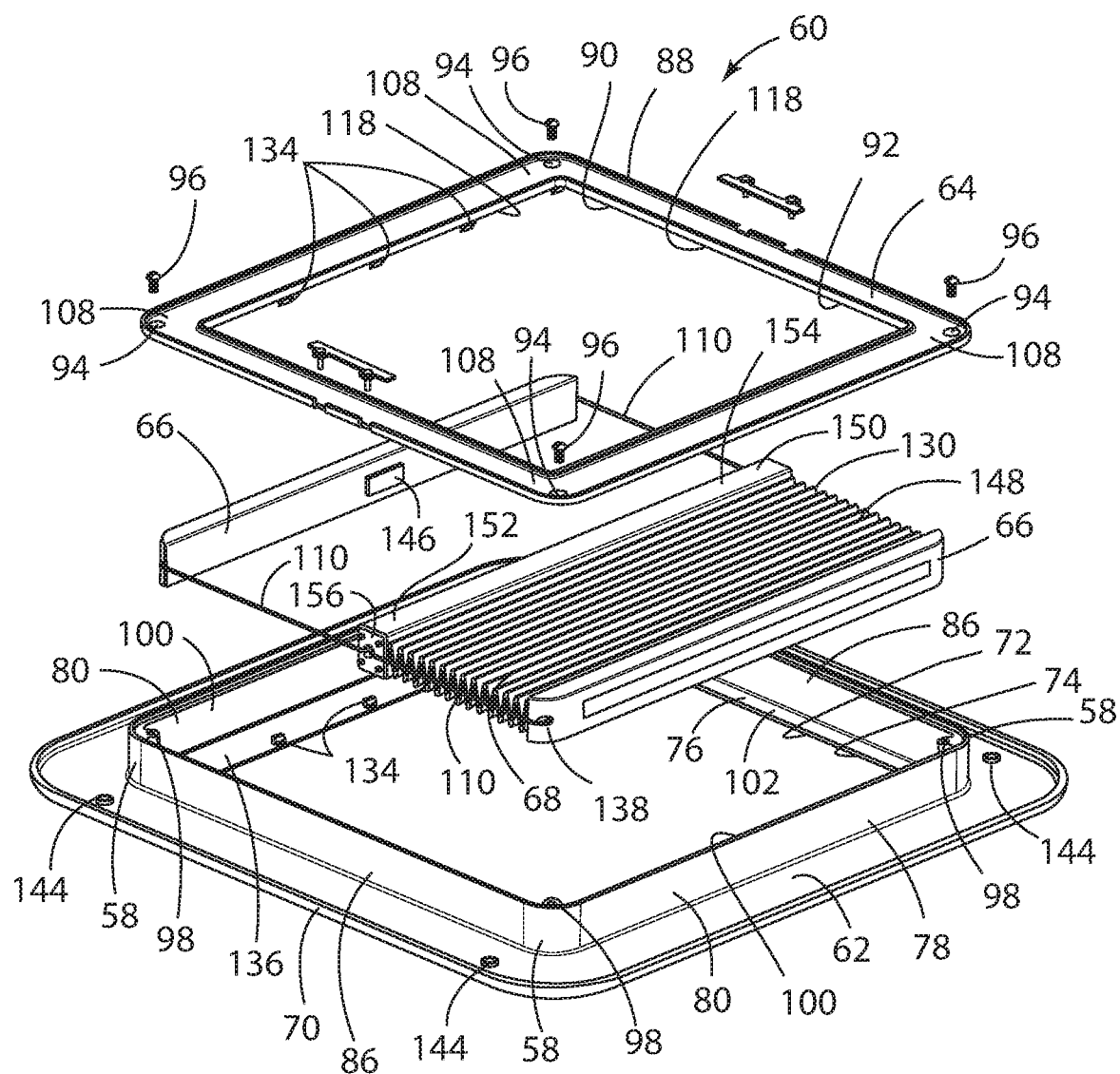
FIG. 16 is a front exploded perspective view of the vent shade assembly of FIG. 6 in accordance with the present disclosure.
Figure 17:
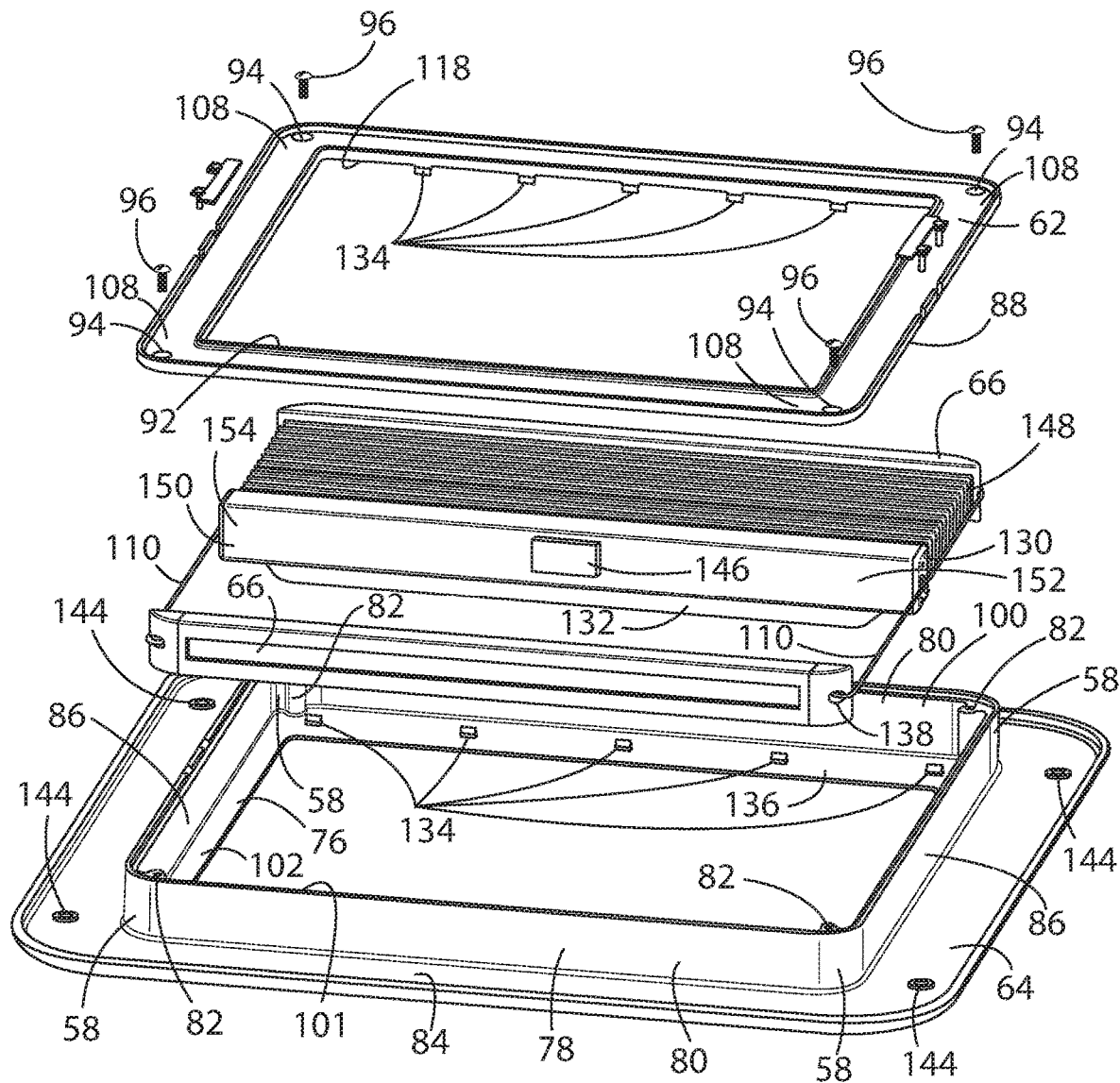
FIG. 17 is a side exploded perspective view of the vent shade assembly of FIG. 6 in accordance with the present disclosure.

As shown in FIGS. 2, 4, and 5, the pair of opposed string guides 66 is restrained between the inner flange 76 of the vent shade outer frame 62 and the inner flange 118 of the vent shade inner frame 64. As perhaps best shown in the FIGS. 4, 5, 10, 16, and 17, each of the pair of opposed string guides 66 is orthogonally mounted relative the pair of side walls 86 between the inner flange 76 of the vent shade outer frame 62 and the inner flange 118 of the vent shade inner frame 64 and disposed in juxtaposed relation with an inner surface 100 of each of the pair of opposed braces 80. In the embodiment shown in FIGS. 4 and 5, each of the pair of opposed string guides 66 may be attached to the upper surface 102 of the inner flange 76 of the vent shade outer frame 62 via a heat staking process. Alternatively, as shown in FIGS. 10 and 15, a portion of each of the inner flange 76, 118 of each of the vent shade outer frame 62 and vent shade inner frame 64 proximate the opposed braces 80 may include a plurality of retention tabs 134. The retention tabs 134 are preferably spaced apart from and in parallel relation with each of the pair of opposed braces 80, respectively, to define a pair of opposed mounts 136 within which each of the opposed string guides 66 is disposed and restrained.

The distal ends 104 of each of the pair of opposed string guides 66 preferably includes a triangular shaped shade end cap 106 that is fittingly received proximate the triangular bosses 82 disposed at each corner of the center wall 78. The shade end cap 106 may be either a separate component fixedly attached to the opposed string guides 66, as shown, or may be integrally formed with the distal end 104 of each of the pair of opposed string guides 66. A pair of shade strings 110 is preferably supported at and operably coupled by a pair of opposed terminal ends 112 of the shade strings 110 to the distal ends 104 of the opposed string guides 66 through an opening 138 in each of the shade end caps 106 provided on the pair of opposed string guides 66, as shown in FIGS. 2 and 10. The terminal ends 112 of the shade strings 110 may then be conveniently tied so that the terminal ends 112 of the shade strings 110 cannot pass through the opening 138, thereby restraining the terminal ends 112 of the shade strings 110.

In a first embodiment, shown in FIGS. 2-5, one of the pair of shade strings 110 is each disposed on opposed sides 114, 116 of the vent shade outer frame 62, proximate each of the side walls 86 and orthogonally to the pair of opposed string guides 66. Each of the pair of shade strings 110 thereby preferably extends between the pair of opposed string guides 66. The movable pleated shade element 68 is preferably disposed horizontally and movably within the slot 120, as discussed above.

In the first embodiment, the movable pleated shade element 68 may be supported by the inner flange 76 of the vent shade outer frame 62 proximate the pair of side walls 86, which, in particular, supports a pair of opposed side edge 126, 128 of the movable pleated shade element 68. The movable pleated shade element 68 may also be guided by the pair of shade strings 110 that each extends through one of a pair of rows 122 of a plurality of evenly disposed openings 124 disposed along each of the pair of opposed side edges 126, 128 of the movable pleated shade element 68. Preferably, one of the pair of shade strings 110 extends through a one of the pair of rows 122 of evenly disposed openings 124 along each of the pair of opposed side edges 126, 128 of the movable pleated shade element 68, as best shown in FIG. 2.

As shown therein, a first shade string 110 extends from a first of a pair of opposed string guides, alongside and parallel to the first side wall 86 and proximate to the first side edge 126 of the movable pleated shade element, through the plurality of evenly disposed openings 124 along the first side edge 126 of the movable pleated shade element 68, and to a second of the pair of opposed string guides 66. A second shade string 110 extends from the first of the pair of opposed string guides 66, alongside and parallel to the second side wall 86 and proximate to the second side edge 128 of the movable pleated shade element 68, through the plurality of evenly disposed openings 124 along the second side edge 128 of the movable pleated shade element 68, and to the second of the pair of opposed string guides 66.

The pair of opposed string guides 66 is preferably arranged in orthogonal relation to the pair of opposed side edges 126, 128 of the movable pleated shade element 68. The pair of shade strings 110 and the pair of opposed side edges 126, 128 of the movable pleated shade element 68 are thus arranged in parallel relation one to the other.

The leading edge 130 of the movable pleated shade element 68 may be manipulated by a vertically depending handle 132 between the open and the closed positions, wherein the handle 132 is operably coupled to the leading edge 130 of the movable pleated shade element 68. When in the closed position, shown in FIG. 4, the leading edge 130 of the movable pleated shade element 68 is brought into juxtaposed relation with one of the of opposed string guides 66. Further, it is contemplated that a fastening device 146, such as cooperating magnets, could be provided on the leading edge 130 of the movable pleated shade element 68 and the one of the pair of opposed string guides 66 to provide a secure closure of the vent shade assembly 60 and may thereby more reliably prevent light from shining through the vent shade assembly 60 when the moveable pleated shade element 68 is in the closed position. An opposed trailing edge 148 of the movable pleated shade element 68 is element is operably coupled with and preferably fixedly attached to the other of the pair of opposed string guides 66 and thereby held in place within the overall vent shade assembly 60.

When installed, as shown in FIGS. 4 and 5, the first embodiment of the vent shade assembly 60 of the present disclosure is preferably received within a garnish 140 of the ceiling vent 30 relative a lower surface 142 of the roof portion 26 of the body 12 of the recreational vehicle 10. Preferably, the outer flange 84 of the vent shade outer frame 62 that forms the outer perimeter 70 of the vent shade outer frame 62 is provided with a plurality of openings 144 at each corner thereof proximate the outer perimeter 70 by which the vent shade assembly 60 may be attached by a fastener (not shown) to the lower surface 142 of the roof portion 26 of the body 12 of the recreational vehicle 10.

In a second embodiment shown in FIGS. 6-17, the vent shade assembly 60 may further include a cross member 150 orthogonally oriented relative the pair of side walls 86 to which the leading edge 130 of the movable pleated shade element 68 is operably coupled. The cross member 150 is in juxtaposed relation with one of the pair of opposed string guides 66 when in the closed position. Again, a fastening device 146, such as cooperating magnets, may be provided on the cross member 150 and the one of the pair of opposed string guides 66 to provide a secure closure of the vent shade assembly 60 and may thereby more reliably prevent light from shining through the vent shade assembly 60 when the moveable pleated shade element 68 is in the closed position. As in the first embodiment, the trailing edge 148 of the movable pleated shade element 68 is operably coupled with the other of the pair of opposed string guides 66.

The cross member 150, which is preferably injection molded as a hollow tube having a rectangular cross section, may also include a handle 132 extending substantially along its length. The cross member 150 is in sliding engagement with the side walls 86 of the slot 120 within which the movable pleated shade element 68 is received and retained as it is operated between the closed position and the open position.

The cross member 150 preferably includes a cross member end cap 156 mounted to each of a first distal end 152 and a second distal end 154 of the cross member 150, as shown in FIGS. 10-14. While it is contemplated that the cross member end cap 156 may be integrally formed with the distal ends 152, 154 of the cross member 150, it is preferred that the cross member end cap 156 be a separate component fixedly attached to the first and second distal ends 152, 154 of the cross member 150, as shown. Each of the cross member end caps 156 preferably has an exposed face 158 and a plurality of protrusions 160 disposed on the exposed face 158 in sliding engagement with each of the side walls 86 of the slot 120 within which the movable pleated shade element 68 is received and retained as it is operated between the closed position and the open position. Preferably, each of the cross member end caps 156 are configured in a rectangular shape, such as a square, to match the rectangular cross section of the cross member 150 and has a plug 162 opposite the exposed face 158 that is fittingly received within and retained by each of the first and a second distal ends 152, 154 of the cross member 150.

Preferably, the protrusions 160 disposed on the exposed face 158 are arranged in a regular geometric pattern, such as a square, where each of the protrusions 160 disposed on the exposed face 158 is disposed proximate an opposed corner of the exposed face, as best seen in FIG. 11. This configuration has been found to prevent binding of the cross member 150 within the slot 120 as the movable pleated shade element 68 is operated between the closed position and the open position. In addition, the cross member end cap 156 may include an opening 164 through the exposed face 158 through which the first and second shade string 110 extend, as explained below.

Figure 13:
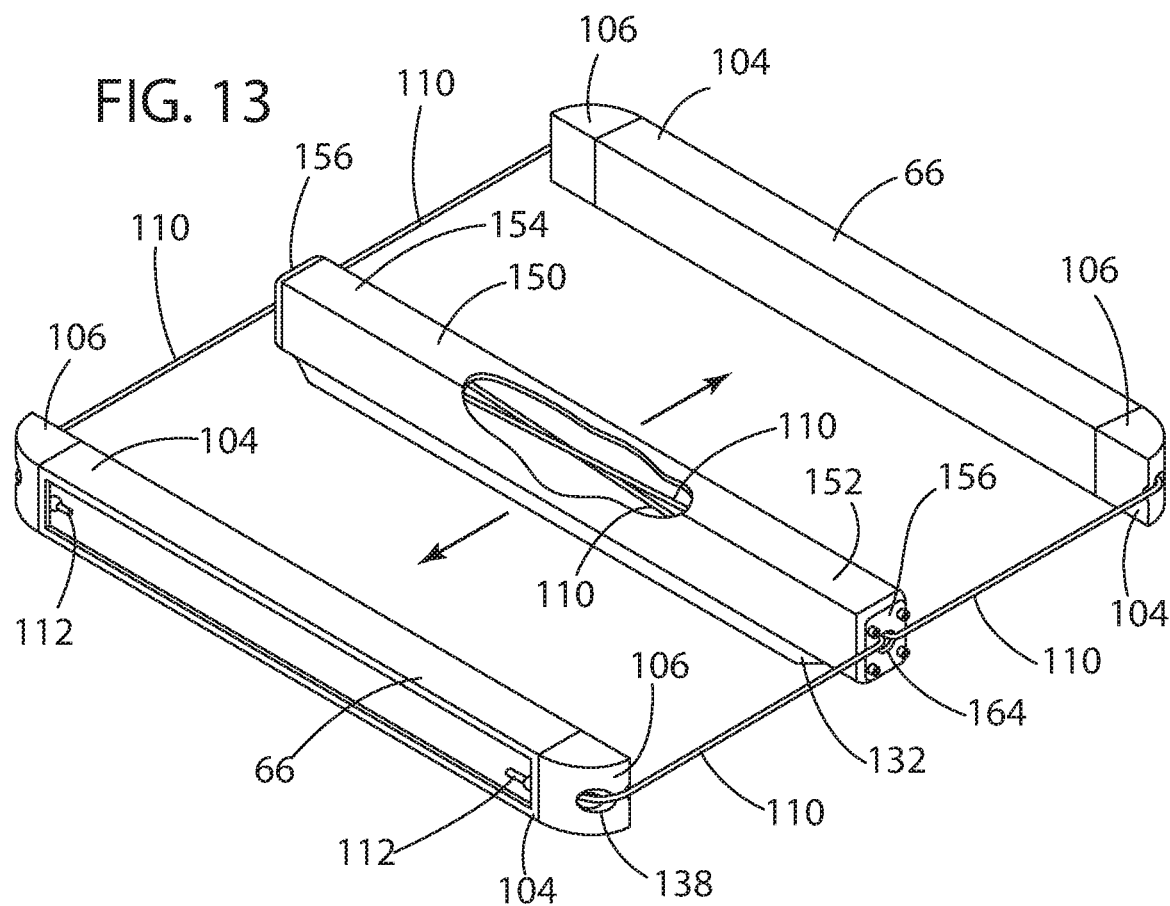
FIG. 13 is a perspective side view of the guide strings, string guides, and cross member of the vent shade assembly of FIG. 6 in accordance with the present disclosure, wherein the movable pleated shade element is in the partially open position.
Figure 14:
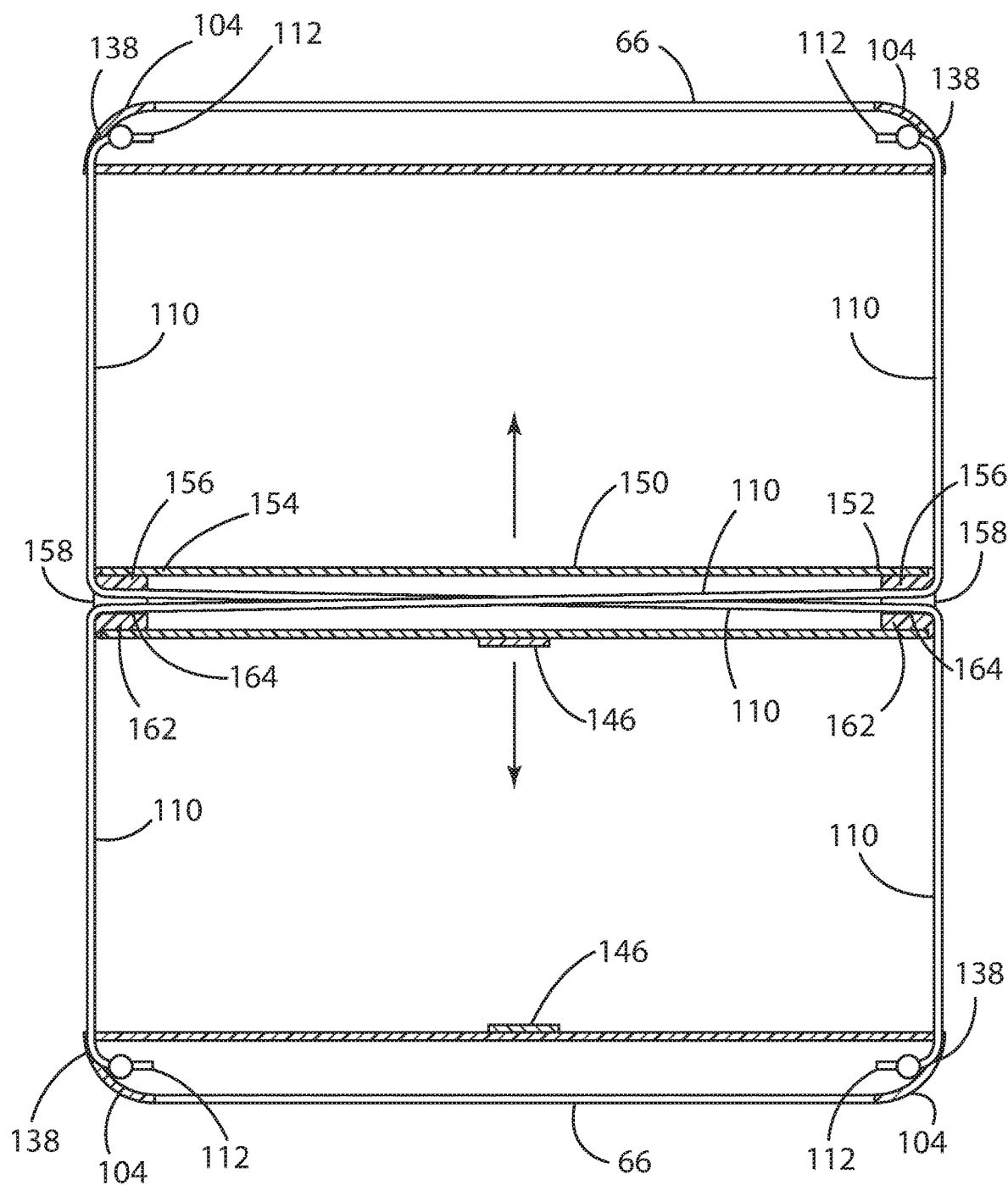
FIG. 14 is a top plan view of the guide strings, string guides, and cross member of the vent shade assembly of FIG. 6 in accordance with the present disclosure, wherein the movable pleated shade element is in the partially open position.

As in the first embodiment, a pair of shade strings 110 may be provided to guide the movable pleated shade element 68 as it is operated between the closed position and the open position. However, in the second embodiment, the first shade string 110 extends from a first of the pair of opposed string guides 66, partially alongside and parallel to a first side wall 86 and proximate to the first side edge 126 of the movable pleated shade element 68, through the openings 164 in the cross member end caps 156 and through the cross member 150, and partially alongside and parallel to a second side wall 86 and proximate the second side edge 128 of the movable pleated shade element 68, and to a second of the pair of opposed string guides 66, as shown in FIGS. 13-14. Similarly, the second shade string 110 extends from the first of the pair of opposed string guides 66, partially alongside and parallel to the second side wall 86 and proximate to the second side edge 128 of the movable pleated shade element 68, through the cross member 150, and partially alongside and parallel to the first side wall 86 and proximate the first side edge 126 of the movable pleated shade element 68, and to the second of the pair of opposed string guides 66.

Thus, the movable pleated shade element may be operated between the closed position and the open position by merely sliding the cross member 150, which is in sliding engagement with the side walls of the slot 120, between the closed position and the open position. The unique arrangements of the shade strings 110 described above ensure that the first and second distal end 152, 154 of the cross member 150 move within the slot 120 at the same rate, thereby preventing tilting and binding of the cross member 150 within the slot 120 as the movable pleated shade element is operated between the closed position and the open position.

It should be noted that each of the opposed string guides 66, cross member 150, and cross member end caps 156 are preferably economically manufactured from polystyrene polymer materials and can be tinted to match the color of the interior 34 of the body 12 of the recreational vehicle 10, as may be desired.

Figure 18:
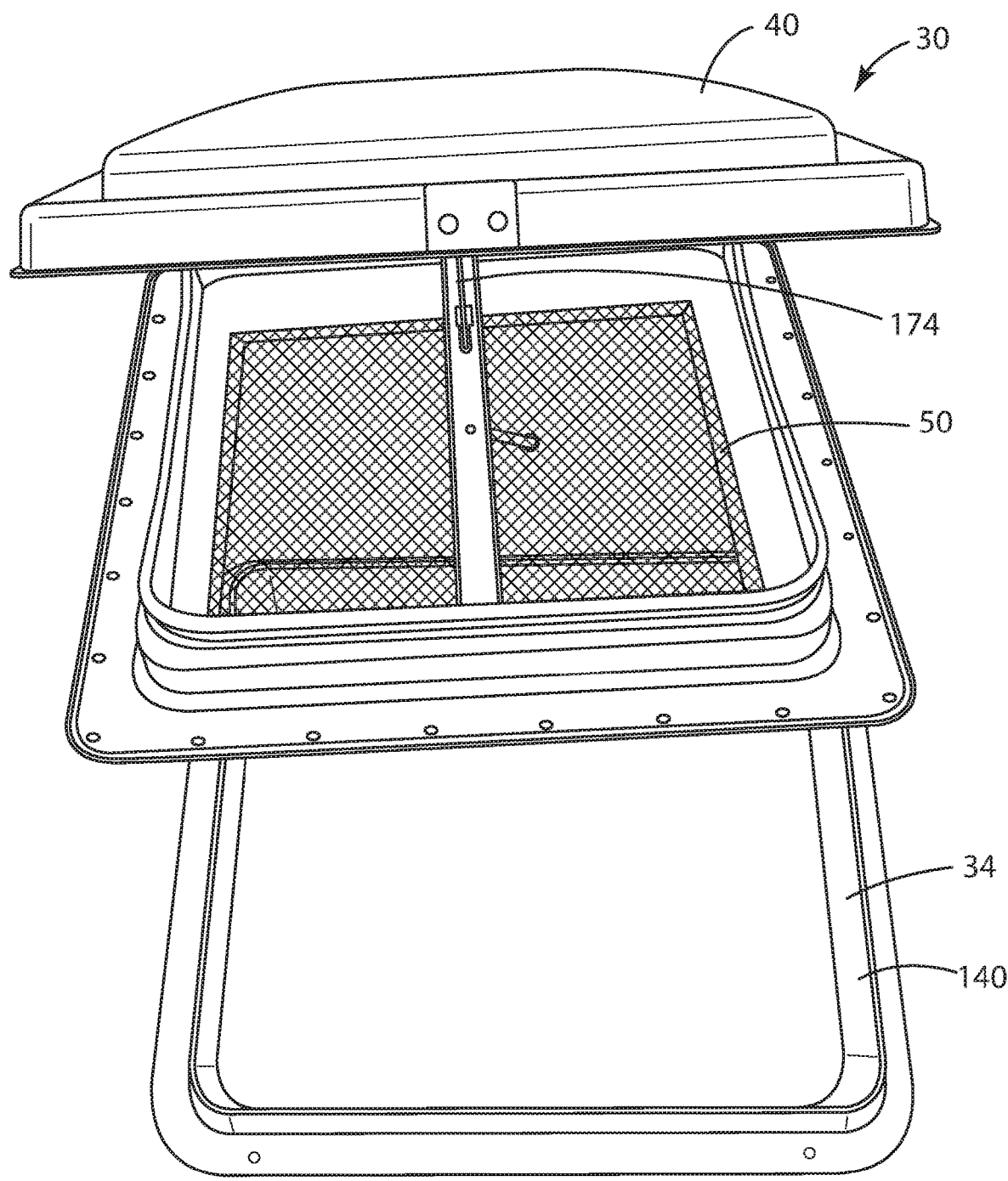
FIG. 18 is a top perspective view of a prior art vent assembly.
Figure 19:
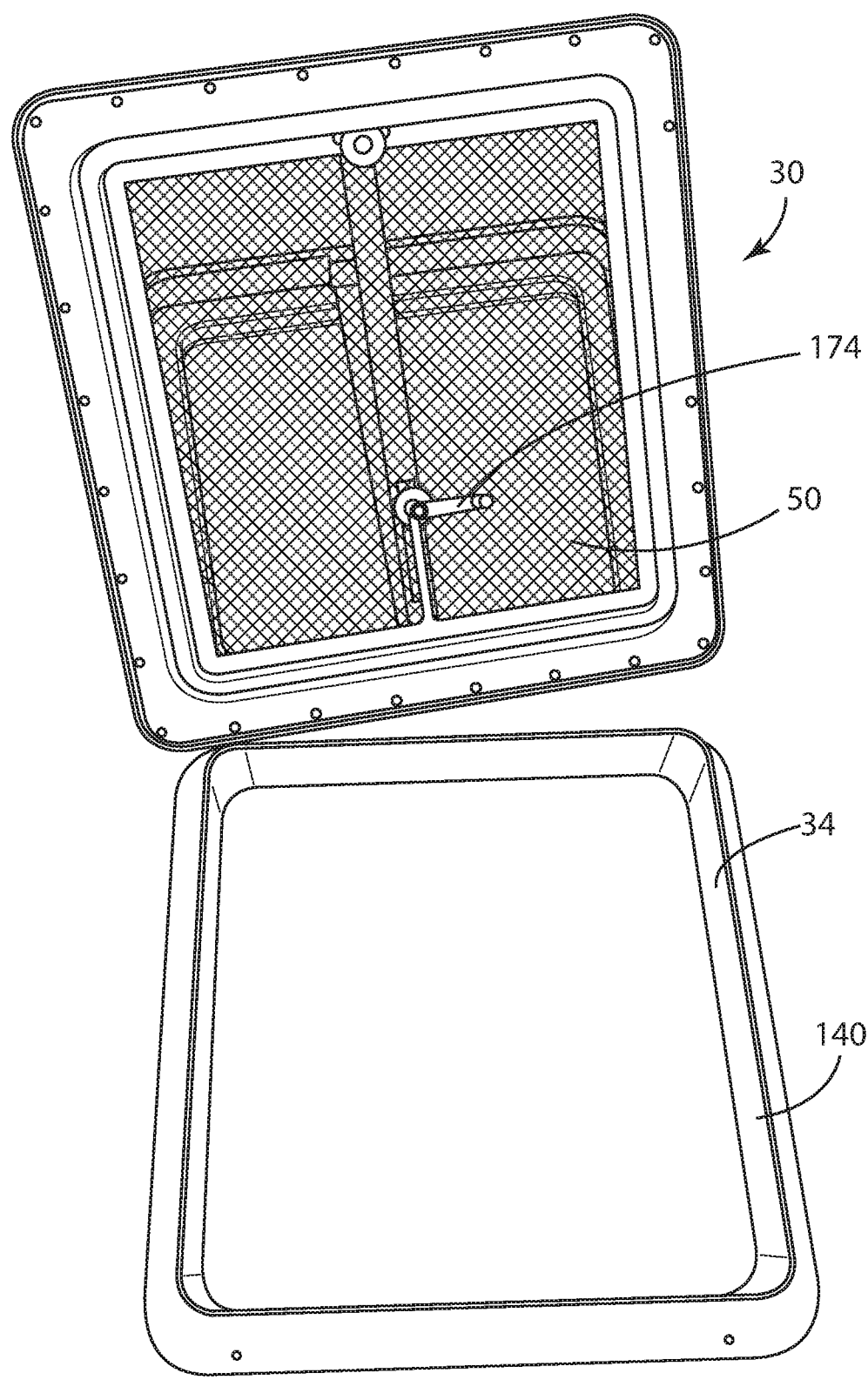
FIG. 19 is a bottom perspective view of a prior art vent assembly, partially disassembled.
Figure 20:
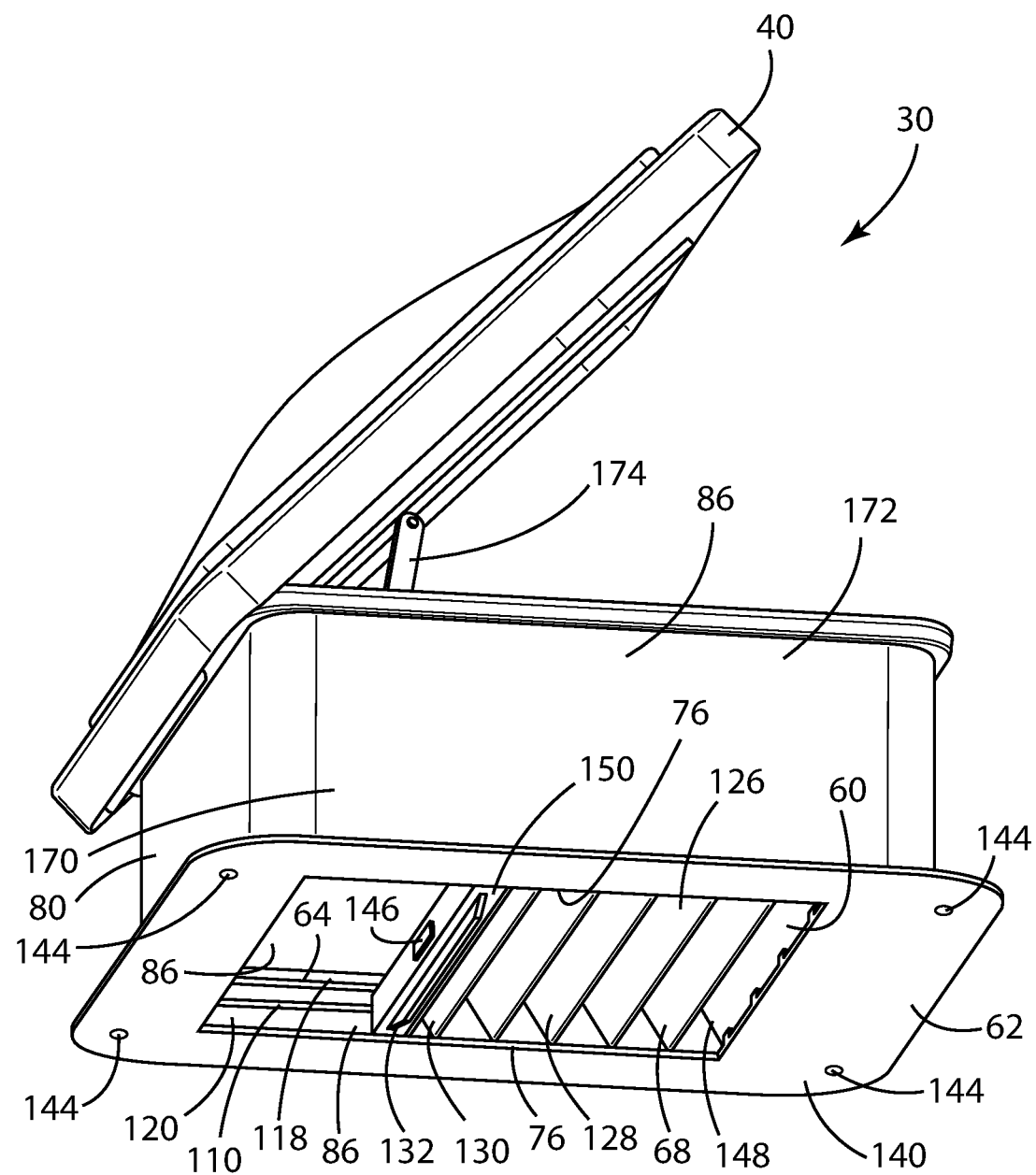
FIG. 20 is a bottom perspective view of a third embodiment of a vent shade assembly integrated into a vent assembly.
Figure 21:
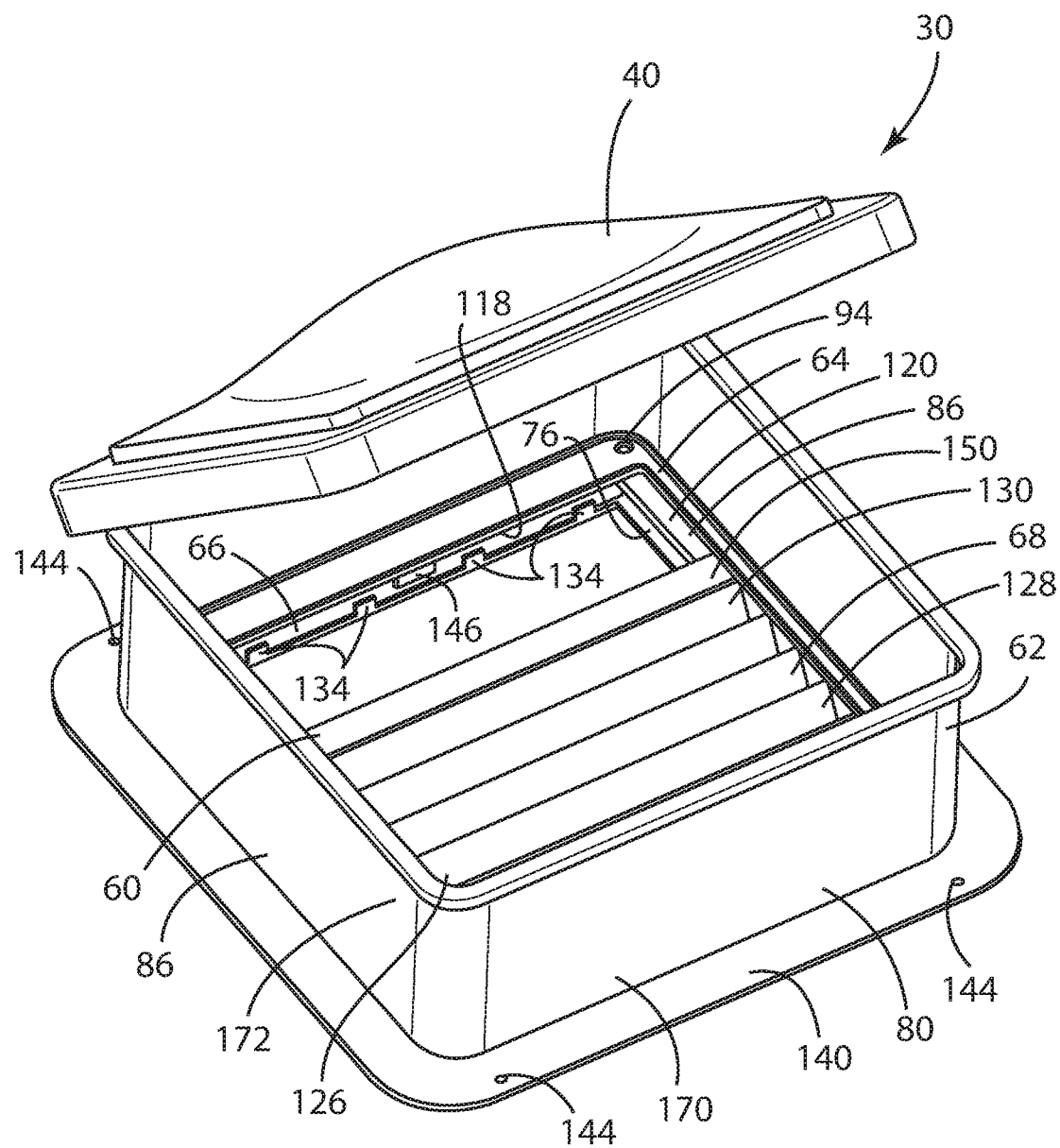
FIG. 21 is a top perspective view of the vent shade assembly of FIG. 18 integrated into a vent assembly, wherein the frame, crank, and screen are omitted.
Figure 22:
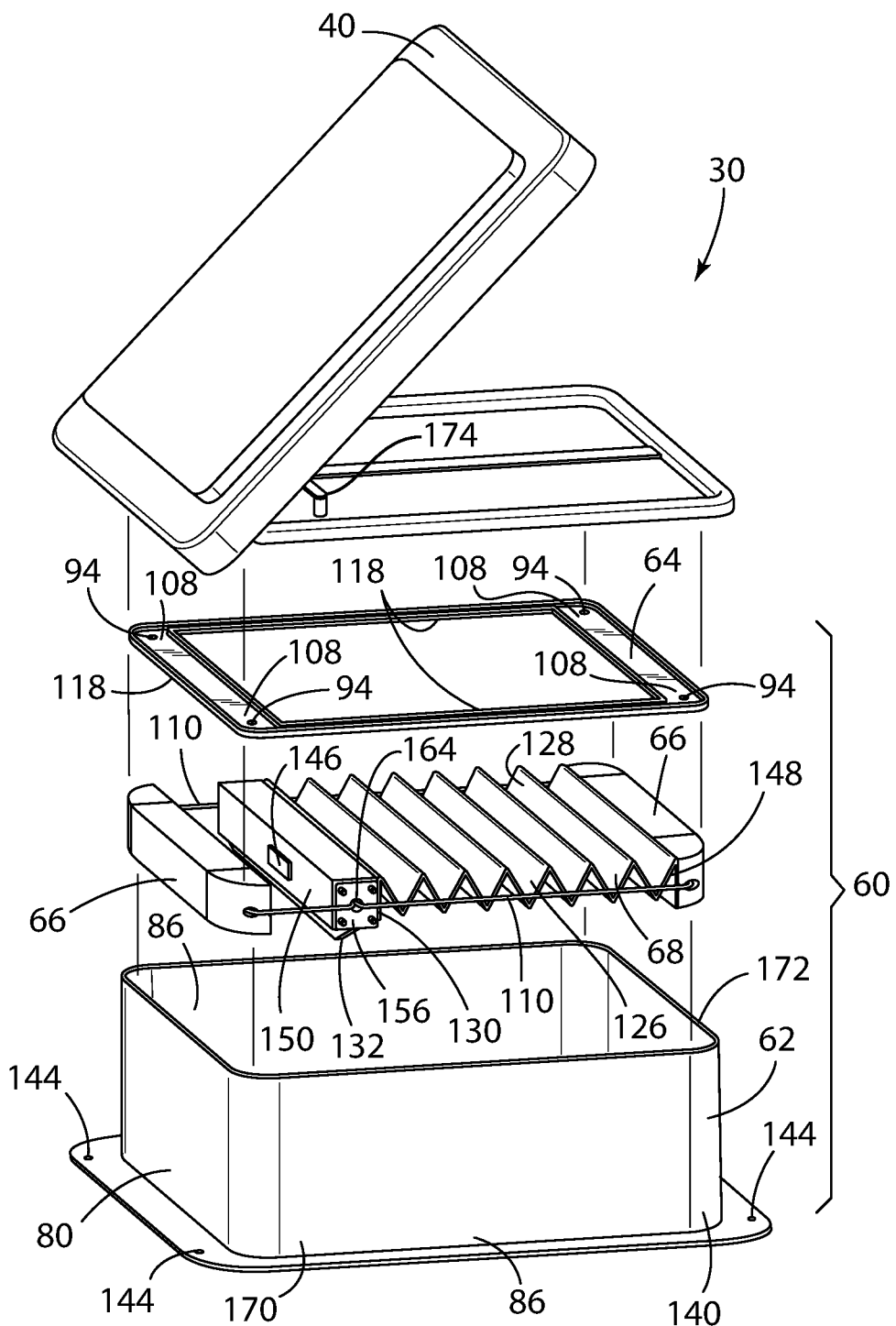
FIG. 22 is an exploded view of the vent shade assembly of FIG. 18 integrated into a vent assembly.

In yet another embodiment, the vent shade outer frame 62 forms the garnish 140 of the ceiling vent itself 30. In this embodiment, shown in FIGS. 20-22, the garnish 140 has a proximal interior end 170 and a distal exterior end 172 to which is operably coupled the vent dome 40, and the vent shade inner frame 64 is received within and operably coupled to the garnish 140 proximate the proximal interior end 170 of the garnish 140. Preferably, as compared to the ceiling vents 30 according to the prior art shown in FIGS. 18-19, the distal exterior end 172 of the garnish 140 of the present disclosure of the vent shade assembly 60 is operably coupled to the vent dome 40, as shown in FIGS. 20-22. The ceiling vent 30 may also include a crank and linkage mechanism 174 disposed proximate the proximal interior end 170 of the garnish 140 and operatively coupled with the vent dome 40, whereby the vent dome 40 may be moved between an open position and a closed position.

Preferably, as the vent shade inner frame 64 is received within and operably coupled to the garnish 140 proximate the proximal interior end 170 of the garnish 140, the inner flange 118 of the vent shade inner frame 64 cooperates with the inner flange 76 of the vent shade outer frame 62 proximate the pair of side walls 86 to define the slot 120 within which the movable pleated shade element 68 is received and retained as it is operated between the closed position and the open position In any of the foregoing embodiments disclosed, it should be noted that the first and a second shade string 110 is disposed at least partially alongside and parallel to the pair of side walls 86, respectively, and proximate the first and the second side edges 126, 128 of the movable pleated shade element 68, respectively. Further, in any of the embodiments disclosed, the movable pleated shade element 68 may be fabricated from an opaque material. In particular, even more preferably, the movable pleated shade element 68 may be fabricated from a pleated flexible fabric material with a BoPET (Biaxially-oriented polyethylene terephthalate) backing, of the type sold under the brand name Mylar®. However, it is further contemplated that the movable pleated shade element 68 may be fabricated from a translucent material in order to provide softer environmental illumination within the interior 34 of the body 12 of the recreational vehicle 10. Finally, as shown in the Figures, the movable pleated shade element 68 in any of the embodiments disclosed may be fabricated as a single layer pleated shade element 68. However, it is contemplated that the movable pleated shade element 68 may also be fabricated as a honeycomb cellular pleated shade element 68 having one or more rows of cellular chambers.

The vent shade assembly 60 of the present disclosure thus creates a self-contained vent shade assembly 60 that may be adapted to fit over the interior facing portions of existing ceiling vents 30 previously installed in manufactured recreational vehicles 10. Alternatively, the vent shade assembly 60 of the present disclosure can be custom-designed as integral with a specific ceiling vent 30 and installed by the original equipment manufacturer of the recreational vehicle 10, as described above.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vent shade assembly for a recreational vehicle ceiling vent comprising:
    a vent shade outer frame having an outer flange forming an outer perimeter and an inner flange forming an inner perimeter and defining a first opening coincident with the recreational vehicle ceiling vent;
    a vent shade inner frame having an outer perimeter and an inner flange forming an inner perimeter and defining a second opening coincident with the recreational vehicle ceiling vent;
    a pair of side walls disposed adjacent opposed sides of the vent shade outer frame between the outer flange of the vent shade outer frame and the inner flange of the vent shade outer frame;
    a movable pleated shade element disposed between the pair of side walls, wherein the movable pleated shade element is operable between a closed position substantially occluding the first opening and second opening, an open position substantially exposing the first and second opening, and a plurality of positions there between, and
    a first and a second shade string disposed at least partially alongside and parallel to a first and second of the pair of side walls, respectively, and proximate a first and a second side edge of the movable pleated shade element forming a pair of opposed side edges, respectively;
    wherein a portion of the inner flange of the vent shade outer frame proximate the pair of side walls supports the pair of opposed side edges of the movable pleated shade element as the movable pleated shade element is operated between the closed position and the open position;
    wherein each of the pair of shade strings is supported at a pair of opposing terminal ends thereof by a pair of opposing string guides, and the pair of shade strings and the pair of opposing side edges of the movable pleated shade element are arranged in parallel relation one to the other; and
    wherein the vent shade outer frame comprises a pair of opposed braces disposed proximate the inner perimeter of the vent shade outer frame and each of the pair of opposing string guides are disposed and in juxtaposed relation with an inner surface of a one of the pair of opposed braces.

2. The vent shade assembly of claim 1, wherein the pair of side walls are integrally formed and injection molded with the vent shade outer frame.

3. The vent shade assembly of claim 1, wherein the pair of side walls are integrally formed and injection molded with the vent shade inner frame.

4. The vent shade assembly of claim 1, wherein the vent shade inner frame is mechanically attached to the vent shade outer frame.

5. The vent shade assembly of claim 1, wherein:
    the movable pleated shade element comprises a plurality of evenly disposed openings along each of the pair of opposed side edges;

the first shade string extends from a first of a pair of opposed string guides, alongside and parallel to a first side wall and proximate to a first side edge of the movable pleated shade element, through the plurality of evenly disposed openings along a first side of the pair of opposed side edges of the movable pleated shade element, and to a second of the pair of opposed string guides; and the second shade string extends from the first of the pair of opposed string guides, alongside and parallel to a second side wall and proximate to a second side edge of the movable pleated shade element, through the plurality of evenly disposed openings along a second side of the pair of opposed side edges of the movable pleated shade element, and to the second of the pair of opposed string guides.

6. A vent shade assembly for a recreational vehicle ceiling vent comprising:

a vent shade outer frame having an outer flange forming an outer perimeter and an inner flange forming an inner perimeter and defining a first opening coincident with the recreational vehicle ceiling vent;

a vent shade inner frame having an outer perimeter and an inner flange forming an inner perimeter and defining a second opening coincident with the recreational vehicle ceiling vent;

a pair of side walls disposed adjacent opposed sides of the vent shade outer frame between the outer flange of the vent shade outer frame and the inner flange of the vent shade outer frame;

a movable pleated shade element disposed between the pair of side walls, wherein the movable pleated shade element is operable between a closed position substantially occluding the first opening and second opening, an open position substantially exposing the first and second opening, and a plurality of positions there between, and a first and a second shade string disposed at least partially alongside and parallel to a first and second of the pair of side walls, respectively, and proximate a first and a second side edge of the movable pleated shade element forming a pair of opposed side edges, respectively;

wherein a portion of the inner flange of the vent shade outer frame proximate the pair of side walls supports the pair of opposed side edges of the movable pleated shade element as the movable pleated shade element is operated between the closed position and the open position;

wherein the vent shade inner frame is mechanically attached to the vent shade outer frame; and wherein the vent shade outer frame further comprises an opening in each of a plurality of bosses disposed on the inner flange of the vent shade outer frame within which is received a fastener extending through a corresponding opening in the vent shade inner frame.

7. The vent shade assembly of claim 1, wherein the vent shade inner frame is heat staked to the vent shade outer frame at a plurality of locations about the inner perimeter of each of the vent shade inner frame and the vent shade outer frame, respectively.

8. A vent shade assembly for a recreational vehicle ceiling vent comprising:

a vent shade outer frame having an outer flange forming an outer perimeter and an inner flange forming an inner perimeter and defining a first opening coincident with the recreational vehicle ceiling vent;

a vent shade inner frame having an outer perimeter and an inner flange forming an inner perimeter and defining a second opening coincident with the recreational vehicle ceiling vent;

a pair of side walls disposed adjacent opposed sides of the vent shade outer frame between the outer flange of the vent shade outer frame and the inner flange of the vent shade outer frame;

a movable pleated shade element disposed between the pair of side walls, wherein the movable pleated shade element is operable between a closed position substantially occluding the first opening and second opening, an open position substantially exposing the first and second opening, and a plurality of positions there between, and a first and a second shade string disposed at least partially alongside and parallel to a first and second of the pair of side walls, respectively, and proximate a first and a second side edge of the movable pleated shade element forming a pair of opposed side edges, respectively;

wherein a portion of the inner flange of the vent shade outer frame proximate the pair of side walls supports the pair of opposed side edges of the movable pleated shade element as the movable pleated shade element is operated between the closed position and the open position;

wherein the outer perimeter of the vent shade inner frame is mounted to the pair of side walls and the inner flange of the vent shade inner frame cooperates with the portion of the inner flange of the vent shade outer frame proximate the pair of side walls supporting the pair of opposed side edges of the movable pleated shade element to define a slot within which the movable pleated shade element is received and retained as it is operated between the closed position and the open position.

9. The vent shade assembly of claim 8, wherein the pair of side walls is integral with a center wall substantially circumscribing the first opening.

10. The vent shade assembly of claim 9, wherein the movable pleated shade element when in the open position has a deployed shape substantially conforming to the outer perimeter of the vent shade inner frame.

11. The vent shade assembly of claim 8, further comprising a pair of opposed string guides orthogonally mounted relative the pair of side walls between the inner flange of the vent shade outer frame and the inner flange of the vent shade inner frame.

12. The vent shade assembly of claim 11, wherein each of the pair of opposed string guides is disposed in juxtaposed relation with an inner surface of a one of a pair of opposed braces, respectively.

13. The vent shade assembly of claim 12, wherein the pair of side walls and the pair of opposed braces are integral with a center wall substantially circumscribing the first opening.

14. The vent shade assembly of claim 13, further comprising a plurality of retention tabs on the inner flange of each of the vent shade outer frame and vent shade inner frame, wherein the retention tabs are spaced apart from and in parallel relation with each of the pair of opposed braces, respectively, to define a pair of opposed mounts within which each of the opposed string guides is disposed and restrained.

15. The vent shade assembly of claim 11, further comprising a cross member orthogonally oriented relative the pair of side walls to which a leading edge of the movable pleated shade element is operably coupled, the cross member being in juxtaposed relation with one of the pair of opposed string guides when in the closed position, and wherein a trailing edge of the movable pleated shade element is operably coupled with the other of the pair of opposed string guides, the cross member being in sliding engagement with each of the pair of the side walls of the slot within which the movable pleated shade element is received and retained as it is operated between the closed position and the open position.

16. The vent shade assembly of claim 15, further comprising a cross member end cap mounted to each of a first and a second distal end of the cross member, the cross member end cap comprising an exposed face and a plurality of protrusions disposed on the exposed face in sliding engagement with each of the pair of the side walls of the slot within which the movable pleated shade element is received and retained as it is operated between the closed position and the open position.

17. The vent shade assembly of claim 15, wherein:
the first shade string extends from a first of the pair of opposed string guides, partially alongside and parallel to a first side wall and proximate to the first side edge of the movable pleated shade element, through the cross member, and partially alongside and parallel to a second side wall and proximate the second side edge of the movable pleated shade element, and to a second of the pair of opposed string guides; and
the second shade string extends from the first of the pair of opposed string guides, partially alongside and parallel to the second side wall and proximate to the second side edge of the movable pleated shade element, through the cross member, and partially alongside and parallel to the first side wall and proximate the first side edge of the movable pleated shade element, and to the second of the pair of opposed string guides.

18. The vent shade assembly of claim 17, further comprising a cross member end cap mounted to each of a first and a second distal end of the cross member, the cross member end cap comprising an exposed face, a plurality of protrusions disposed on the exposed face in sliding engagement with the each of the side walls of the slot within which the movable pleated shade element is received and retained as it is operated between the closed position and the open position, and an opening through the exposed face through which the first and second shade strings extend.

19. A vent shade assembly for a recreational vehicle ceiling vent comprising:
a vent shade outer frame having an outer flange forming an outer perimeter and an inner flange forming an inner perimeter and defining a first opening coincident with the recreational vehicle ceiling vent;
a pair of side walls on the vent shade outer frame between the outer flange and the inner flange, one each of the pair of side walls disposed on opposed sides of the vent shade outer frame;
a movable pleated shade element disposed between the pair of side walls, wherein the movable pleated shade element is operable between a closed position substantially occluding the first opening, an open position substantially exposing the first opening, and a plurality of positions there between; and
a first and a second shade string disposed at least partially alongside and parallel to a first and second of the pair of side walls, respectively, and proximate the movable pleated shade element, respectively;
wherein the inner flange of the vent shade outer frame proximate the pair of side walls supports the movable pleated shade element as the movable pleated shade element is operated between the closed position and the open position;
wherein each of the first and second shade strings is supported at a pair of opposing terminal ends thereof by a pair of opposing string guides, and the first and second shade strings and a pair of opposing side edges of the movable pleated shade element are arranged in parallel relation one to the other; and
wherein the vent shade outer frame comprises a pair of opposed braces disposed proximate the inner perimeter of the vent shade outer frame and each of the pair of opposing string guides are disposed and in juxtaposed relation with an inner surface of a one of the pair of opposed braces.

20. The vent shade assembly of claim 19, further comprising a handle operably coupled to a leading edge of the movable pleated shade element, the handle being in juxtaposed relation with one of a pair of opposed string guides when in the closed position, and wherein a trailing edge of the movable pleated shade element is operably coupled with the other of the pair of opposed string guides, the movable pleated shade element being in sliding engagement with the side walls as it is operated between the closed position and the open position.

21. The vent shade assembly of claim 20, wherein the handle further comprises:
a cross member orthogonally oriented relative the pair of side walls to which the leading edge of the movable pleated shade element is operably coupled, the cross member being in juxtaposed relation with one of the pair of opposed string guides when in the closed position; and
a cross member end cap mounted to each of a first and a second distal end of the cross member, the cross member end cap comprising an exposed face and a plurality of protrusions disposed on the exposed face in sliding engagement with the each of the side walls within a slot within which the movable pleated shade element is received and retained as it is operated between the closed position and the open position.

22. The vent shade assembly of claim 19, further comprising a vent shade inner frame having an outer perimeter and an inner flange forming an inner perimeter and defining a second opening coincident with the recreational vehicle ceiling vent, and wherein the inner flange of the vent shade outer frame proximate the pair of side walls and the inner flange of the vent shade inner frame proximate the pair of side walls defines a slot within which the movable pleated shade element is received and retained as it is operated between the closed position and the open position.

23. The vent shade assembly of claim 22, wherein the vent shade outer frame further comprises a garnish having a proximal interior end and a distal exterior end to which is operably coupled a vent dome.

24. The vent shade assembly of claim 23, wherein the vent shade inner frame is received within and operably coupled to the garnish proximate the interior end of the garnish.

25. The vent shade assembly of claim 24, further comprising a crank and linkage mechanism disposed proximate the proximal interior end of the garnish and operatively coupled with the vent dome, whereby the vent dome may be moved between an open position and a closed position.

26. A vent shade assembly for a recreational vehicle ceiling vent comprising:
a substantially rectangular vent shade outer frame having an outer flange forming an outer perimeter and an inner flange forming an inner perimeter and defining a first opening coincident with the recreational vehicle ceiling vent;

a substantially rectangular vent shade inner frame having an outer perimeter and an inner flange forming an inner perimeter and defining a second opening coincident with the recreational vehicle ceiling vent;

a pair of side walls disposed adjacent the vent shade outer frame between the outer flange of the vent shade outer frame and the inner flange of the vent shade outer frame, one each of the pair of side walls being disposed adjacent opposed sides of the vent shade outer frame, wherein the inner flange of the vent shade inner frame cooperates with a portion of the inner flange of the vent shade outer frame proximate the pair of side walls to define a slot;

a pair of opposed string guides restrained between the inner flange of the vent shade outer frame and the inner flange of the vent shade inner frame and orthogonally mounted relative the pair of side walls;

a pair of shade strings extending between the pair of opposed string guides; and a movable pleated shade element received and retained within the slot as it is operated between a closed position substantially occluding the first opening of the vent shade outer frame and an open position, wherein a pair of opposed side edges of a movable pleated shade element is supported by the portion of the inner flange of the vent shade outer frame proximate the pair of side walls;

wherein each of the pair of shade strings is supported at a pair of opposing terminal ends thereof by a pair of opposing string guides, and the pair of shade strings and a pair of opposing side edges of the movable pleated shade element are arranged in parallel relation one to the other; and wherein the vent shade outer frame comprises a pair of opposed braces disposed proximate the inner perimeter of the vent shade outer frame and each of the pair of opposing string guides are disposed and in juxtaposed relation with an inner surface of a one of the pair of opposed braces.

27. The vent shade assembly of claim 26, further comprising:

a cross member orthogonally oriented relative the pair of side walls to which a leading edge of the movable pleated shade element is operably coupled, the cross member being in juxtaposed relation with one of the pair of opposed string guides when in the closed position, and wherein a trailing edge of the movable pleated shade element is operably coupled with the other of the pair of opposed string guides, the cross member being in sliding engagement with the pair of side walls within the slot; and a cross member end cap mounted to each of a first and a second distal end of the cross member, the cross member end cap comprising an exposed face and a plurality of protrusions disposed on the exposed face in sliding engagement with the each of the pair of side walls of the slot within which the movable pleated shade element is received and retained as it is operated between the closed position and the open position.

28. The vent shade assembly of claim 27, wherein:

a first shade string extends from a first of the pair of opposed string guides, partially alongside and parallel to a first side wall and proximate to a first side edge of the movable pleated shade element, through the cross member, and partially alongside and parallel to a second side wall and proximate a second side edge of the movable pleated shade element, and to a second of the pair of opposed string guides; and a second shade string extends from the first of the pair of opposed string guides, partially alongside and parallel to the second side wall and proximate to the second side edge of the movable pleated shade element, through the cross member, and partially alongside and parallel to the first side wall and proximate the first side edge of the movable pleated shade element, and to the second of the pair of opposed string guides.

29. The vent shade assembly of claim 26, wherein the movable pleated shade element comprises a plurality of evenly disposed openings along each of the pair of opposed side edges, and wherein:

a first shade string extends from a first of the pair of opposed string guides, alongside and parallel to a first side wall and proximate to the first side edge of the movable pleated shade element, through the plurality of evenly disposed openings along a first side of the pair of opposed side edges of the movable pleated shade element, and to a second of the pair of opposed string guides; and a second shade string extends from the first of the pair of opposed string guides, alongside and parallel to a second side wall and proximate to the second side edge of the movable pleated shade element, through the plurality of evenly disposed openings along a second side of the pair of opposed side edges of the movable pleated shade element, and to the second of the pair of opposed string guides.

30. The vent shade assembly of claim 26, wherein the vent shade outer frame further comprises a garnish having a proximal interior end and a distal exterior end to which is operably coupled a vent dome, and the vent shade inner frame is received within and operably coupled to the garnish proximate the interior end of the garnish.

* * * * *